United States Patent
Matsuda et al.

(10) Patent No.: US 10,994,958 B2
(45) Date of Patent: May 4, 2021

(54) FASTENING MEMBER DETECTION DEVICE

(71) Applicant: PFU Limited, Ishikawa (JP)

(72) Inventors: Yuki Matsuda, Ishikawa (JP); Masaya Takamori, Ishikawa (JP); Shigeharu Okano, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 34 days.

(21) Appl. No.: 16/279,697

(22) Filed: Feb. 19, 2019

(65) Prior Publication Data

US 2019/0177101 A1 Jun. 13, 2019

Related U.S. Application Data

(63) Continuation of application No. PCT/JP2016/074544, filed on Aug. 23, 2016.

(51) Int. Cl.
| | |
|---|---|
| *B65H 7/06* | (2006.01) |
| *G01H 11/08* | (2006.01) |
| *B65H 3/06* | (2006.01) |
| *B65H 5/06* | (2006.01) |
| *G01H 11/06* | (2006.01) |

(52) U.S. Cl.
CPC ............... *B65H 7/06* (2013.01); *B65H 3/06* (2013.01); *B65H 5/06* (2013.01); *G01H 11/06* (2013.01); *G01H 11/08* (2013.01); *B65H 2404/144* (2013.01); *B65H 2511/521* (2013.01); *B65H 2515/50* (2013.01); *B65H 2553/26* (2013.01); *B65H 2553/61* (2013.01); *B65H 2553/822* (2013.01)

(58) Field of Classification Search
CPC ............... B65H 2553/612; B65H 7/06; B65H 2511/521; B65H 2515/50; B65H 2553/26; B65H 2553/614; B65H 5/06; B65H 3/06; G01H 11/06
See application file for complete search history.

(56) References Cited

U.S. PATENT DOCUMENTS

| | | | |
|---|---|---|---|
| 8,651,473 | B2 | 2/2014 | Suzuki et al. |
| 8,864,130 | B2 | 10/2014 | Umi et al. |

(Continued)

FOREIGN PATENT DOCUMENTS

| | | |
|---|---|---|
| JP | 05-058512 A | 3/1993 |
| JP | 08-239141 A | 9/1996 |
| JP | 2000-159449 A | 6/2000 |

(Continued)

OTHER PUBLICATIONS

International Search Report issued in corresponding International Patent Application No. PCT/JP2016/074544, dated Oct. 11, 2016, with English Translation.

(Continued)

*Primary Examiner* — Jeremy R Severson
(74) *Attorney, Agent, or Firm* — McDermott Will & Emery LLP

(57) ABSTRACT

A fastening member detection device includes a contact structure that moves with respect to a medium while contacting the medium, a vibration detector that detects vibration that occur in the contact structure, and a controller that determines whether there is a fastening member that fastens the medium, based on the vibration.

6 Claims, 17 Drawing Sheets

(56) References Cited

U.S. PATENT DOCUMENTS 9,359,156 B2 * 6/2016 Shimazu .................. B65H 1/14
9,434,570 B2 * 9/2016 Matsuo .................. B65H 29/22

FOREIGN PATENT DOCUMENTS

| JP | 2000-263470 A | 9/2000 |
| JP | 2006-206198 A | 8/2006 |
| JP | 2007-150909 A | 6/2007 |
| JP | 2012-210986 A | 11/2012 |
| JP | 2014-045256 A | 3/2014 |

OTHER PUBLICATIONS

Decision to Grant a Patent issued in corresponding Japanese Patent Application No. 2018-535966, dated Oct. 20, 2020, with English translation.

* cited by examiner

FASTENING MEMBER DETECTION DEVICE

CROSS-REFERENCE TO RELATED APPLICATION

This application is a continuation application of International Application No. PCT/JP2016/074544, filed on Aug. 23, 2016 and designated the U.S., the entire contents of which are incorporated herein by reference.

FIELD

The disclosed technology relates to a fastening member detection device.

BACKGROUND

Digitization of a plurality of paper documents that are put in a binder with a scanner device has been widely performed. Paper documents put in a binder may contain a fastened medium that is fastened by a staple or a clip. When such fastened medium is inserted into a scanner device, the media may be damaged or the scanner device may have trouble. For this reason, documents to be inserted into the scanner device are inserted into the scanner device after pre-processing to detect whether the documents are fastened with a staple is performed. Devices that automatically detect whether there is a staple have been known (see Japanese Laid-open Patent Publication No. 5-58512, Japanese Laid-open Patent Publication No. 2000-159449, Japanese Laid-open Patent Publication No. 2006-206198 and Japanese Laid-open Patent Publication No. 2012-210986).

Such a device however has a problem in that the device sometimes falsely detects whether there is a fastening member that fastens media. For example, as for a technology to detect a staple by using a magnetic no-contact metal detection technology, it may be falsely detected that there is no staple depending on the material of a staple. As for a method of detecting a staple by conduction through conductive rubber rollers between which a medium is interposed, when anticorrosive treatment has been applied to the surface of a staple, no conduction may occur and thus no staple may be detected. As for a technology to detect a staple by detecting a difference in color between a paper media and a staple by performing image processing, a copy print of a staple obtained by copying a medium fastened with a staple may be falsely detected as a staple.

SUMMARY

According to an aspect of an embodiment, a fastening member detection device includes a contact structure that moves with respect to a medium while contacting the medium, a vibration detector that detects vibration that occur in the contact structure, and a controller that determines whether there is a fastening member that fastens the medium, based on the vibration.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENTS

Preferred embodiments of the disclosure will be explained with reference to accompanying drawings. With reference to the accompanying drawings, a fastening member detection device according to an embodiment disclosed herein will be explained below. In the following descriptions, the same components are denoted with the same reference numbers and redundant explanation will be omitted.

Fastening Member Automatic Removal Device

Figure 1:
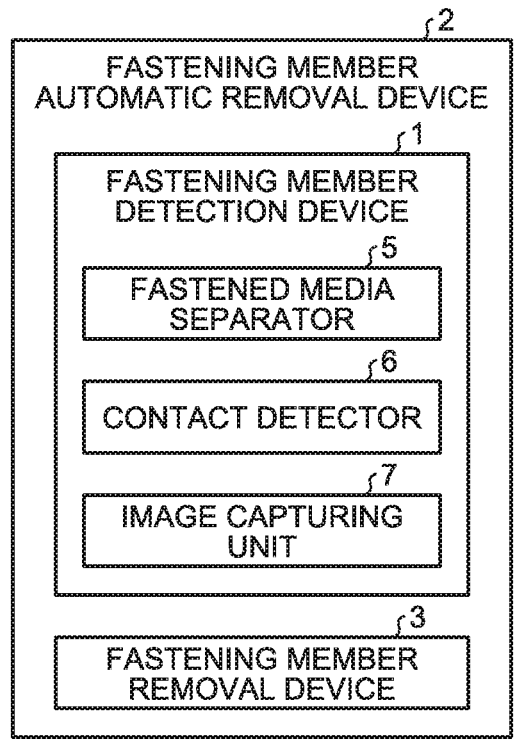
FIG. 1 is a block diagram of a fastening member automatic removal device that is provided with a fastening member detection device of an embodiment.

FIG. 1 is a block diagram of a fastening member automatic removal device that is provided with a fastening member detection device of an embodiment. As illustrated in FIG. 1, a fastening member detection device 1 of the embodiment is provided in a fastening member automatic removal device 2. The fastening member automatic removal device 2 includes the fastening member detection device 1 and a fastening member removal device 3. The fastening member detection device 1 includes a fastened media separator 5, a contact detector 6, and an image capturing unit 7. The fastened media separator 5 separates a plurality of media that is supplied to the fastening member automatic removal device 2 from one another and supplies the media one by one to the contact detector 6. Each of the media is a single sheet of paper or is a fastened medium that is formed of a plurality of sheets of paper that are fastened with a staple.

The contact detector 6 detects whether there is a staple that fastens a medium that is supplied from the fastened media separator 5. When it is detected that there is a staple, the contact detector 6 detects an area in which the staple is arranged. The contact detector 6 further supplies the medium on which whether there is staple has been detected to the image capturing unit 7. When the contact detector 6 detects that there is a staple, the image capturing unit 7 captures an image of the area that is detected by the contact detector 6 in the medium that is supplied from the contact detector 6. Based on the image that is captured by the image capturing unit 7, the fastening member detection device 1 calculates a position in which the staple is arranged on the medium and orientation of the staple.

The fastening member removal device 3 is formed to execute the same operation as an operation of an operator to remove a staple from a fastened medium with a jig. When the fastening member detection device 1 detects that the medium has a staple, the fastening member removal device 3 removes the staple from the medium based on the position and orientation of the staple that are detected by the fastening member detection device 1.

Contact Detector

Figure 2:
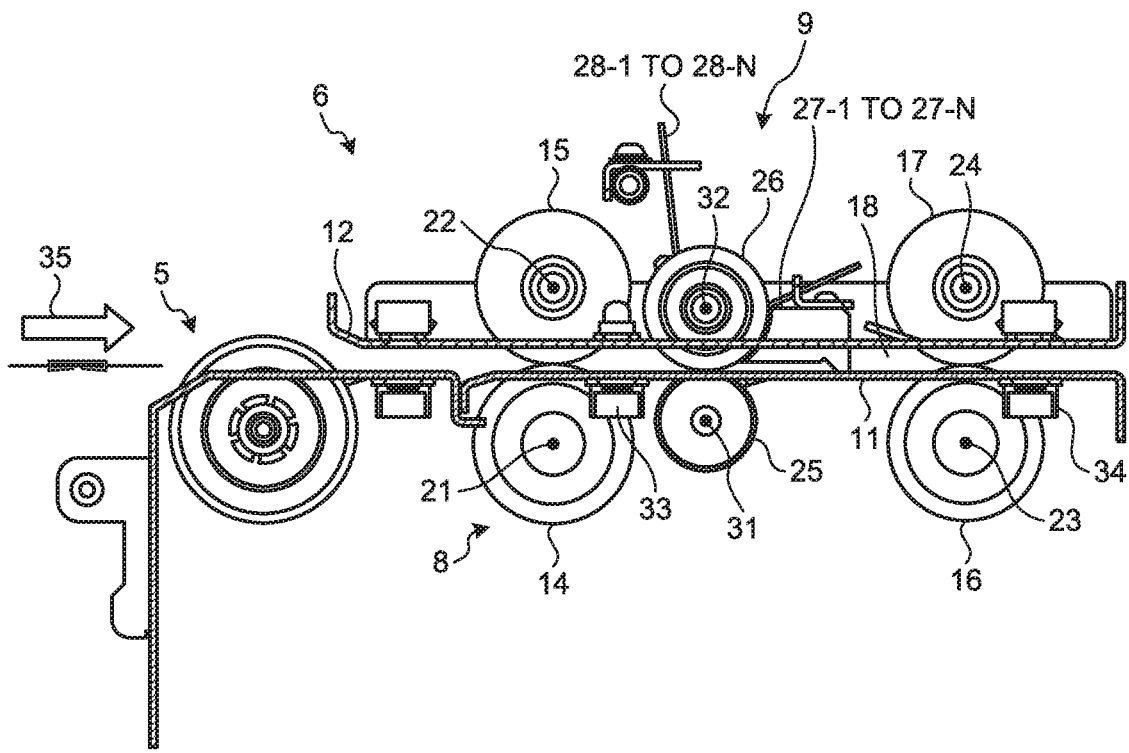
FIG. 2 is a cross-sectional view of a contact detector.

FIG. 2 is a cross-sectional view of the contact detector. As illustrated in FIG. 2, the contact detector 6 includes a conveyance unit 8 and a sensor unit 9. The conveyance unit 8 includes a lower conveyance guide 11, an upper conveyance guide 12, a first lower conveyance roller 14, a first upper conveyance roller 15, a second lower conveyance roller 16, and a second upper conveyance roller 17. The contact detector 6 includes a device frame that is not illustrated in FIG. 2. The device frame is fixed to a setting surface on which the contact detector 6 is placed. The lower conveyance guide 11 is formed in a shape of an approximately flat plate. The lower conveyance guide 11 is arranged along a flat plane approximately parallel to a surface on which the fastening member detection device 1 is set and is fixed to the device frame. The upper conveyance guide 12 is formed in a shape of an approximately flat plate. The upper conveyance guide 12 is arranged above the lower conveyance guide 11 such that the upper conveyance guide 12 is opposed to the lower conveyance guide 11 and the upper conveyance guide 12 is fixed to the device frame. The contact detector 6 includes the lower conveyance guide 11 and the upper conveyance guide 12, thereby forming a conveyance path 18. The conveyance path 18 is formed between the lower conveyance guide 11 and the upper conveyance guide 12.

The first lower conveyance roller 14 is formed in a cylindrical shape and is arranged under the conveyance path 18. The first lower conveyance roller 14 is supported by the device frame such that the first lower conveyance roller 14 is rotatable on a rotation axis 21. The rotation axis 21 is approximately parallel to the setting surface on which the contact detector 6 is placed and is fixed to the device frame. The first upper conveyance roller 15 is formed in a cylindrical shape and is arranged above the first lower conveyance roller 14 such that the medium that is conveyed on the conveyance path 18 is interposed between the first lower conveyance roller 14 and the first upper conveyance roller 15. The first upper conveyance roller 15 is supported by the device frame such that first upper conveyance roller 15 is rotatable on a rotation axis 22. The rotation axis 22 is parallel to the rotation axis 21 and is capable of moving up and down with respect to the device frame. The first upper conveyance roller 15 is further pushed downward by a spring, which is not illustrated in FIG. 2, such that the medium that is conveyed on the conveyance path 18 contacts both an outer circumferential surface of the first lower conveyance roller 14 and an outer circumferential surface of the first upper conveyance roller 15.

The second lower conveyance roller 16 is formed in a cylindrical shape and is arranged under the conveyance path 18. The second lower conveyance roller 16 is supported by the device frame such that the second lower conveyance roller 16 is rotatable on a rotation axis 23. The rotation axis 23 is parallel to the rotation axis 21 and is fixed to the device frame. The second upper conveyance roller 17 is formed in a cylindrical shape and is arranged above the second lower conveyance roller 16 such that the medium that is conveyed on the conveyance path 18 is interposed between the second lower conveyance roller 16 and the second upper conveyance roller 17. The second upper conveyance roller 17 is supported by the device frame such that the second upper conveyance roller 17 is rotatable on a rotation axis 24. The rotation axis 24 is parallel to the rotation axis 23 and is capable of moving up and down with respect to the device frame. The second upper conveyance roller 17 is further pushed downward by a spring, which is not illustrated in FIG. 2, such that the medium that is conveyed on the conveyance path 18 contacts both an outer circumferential surface of the second lower conveyance roller 16 and an outer circumferential surface of the second upper conveyance roller 17.

The sensor unit 9 includes a roller 25, a roller 26, a plurality of contact structures 27-1 to 27-N (N=2, 3, 4, 5 . . . ) and a plurality of springs 28-1 to 28-N. The roller 25 is formed in a cylindrical shape and is arranged between the first lower conveyance roller 14 and the second lower conveyance roller 16 under the conveyance path 18. The roller 25 is supported by the device frame such that the roller 25 is rotatable on a rotation axis 31. The rotation axis 31 is parallel to the rotation axis 21 and is fixed to the device frame. The roller 26 is arranged above the roller 25 such that the medium that is conveyed on the conveyance path 18 is interposed between the roller 25 and the roller 26. The roller 26 is supported by the device frame such that the roller 26 is rotatable on a rotation axis 32. The rotation axis 32 is parallel to the rotation axis 31 and is capable of moving up and down with respect to the device frame. The roller 26 is further pushed downward by a spring, which is illustrated in FIG. 2, such that the medium that is conveyed on the conveyance path 18 contacts both an outer circumferential surface of the roller 25 and an outer circumferential surface of the roller 26. Thus, the rotation axis 32 moves up and down in synchronization with the going up and down of the roller 26. In other words, the roller 26 is lifted up by the medium that is conveyed on the conveyance path 18 and this enables the rotation axis 32 to go up with the distance between the medium and the rotation axis 32 kept constant.

The contact structures 27-1 to 27-N are arranged between the roller 26 and the second upper conveyance roller 17 above the conveyance path 18. The springs 28-1 to 28-N correspond to the contact structures 27-1 to 27-N, respectively.

The sensor unit 9 further includes a first paper sensor 33 and a second paper sensor 34. The first paper sensor 33 is arranged between the first lower conveyance roller 14 and the roller 25 under the conveyance path 18. The first paper sensor 33 detects whether the medium is arranged in an area near the first paper sensor 33 on the conveyance path 18. The second paper sensor 34 is arranged under the conveyance path 18 such that the second lower conveyance roller 16 is arranged between the contact structures 27-1 to 27-N and the second paper sensor 34. The second paper sensor 34 detects whether the medium is arranged in an area near the second paper sensor 34 on the conveyance path 18.

A medium that is supplied from the fastened media separator 5 to the contact detector 6 is supplied to the conveyance path 18. The first lower conveyance roller 14 rotates normally on the rotation axis 21 (clockwise in FIG. 2) and the first upper conveyance roller 15 rotates normally on the rotation axis 22 (counterclockwise in FIG. 2) and thus the medium that is supplied to the conveyance path 18 is conveyed in a paper conveyance direction 35 in which the medium gets away from the fastened media separator 5. The paper conveyance direction 35 is parallel to the plane surface along which the lower conveyance guide 11 is and is perpendicular to the rotation axis 21. The medium that is conveyed on the conveyance path 18 passes between the first lower conveyance roller 14 and the first upper conveyance roller 15 and then passes near the first paper sensor 33. After passing near the first paper sensor 33, the medium conveyed on the conveyance path 18 passes between the roller 26 and the roller 25.

After passing between the roller 26 and the roller 25, the medium conveyed on the conveyance path 18 passes under the contact structures 27-1 to 27-N. After passing under the contact structures 27-1 to 27-N, the medium conveyed on the conveyance path 18 passes between the second lower conveyance roller 16 and the second upper conveyance roller 17. The second lower conveyance roller 16 rotates normally (clockwise as illustrated in FIG. 2) on the rotation axis 23 and the second upper conveyance roller 17 rotates normally (counterclockwise as illustrated in FIG. 2) on the rotation axis 24 and thus the medium that is conveyed on the conveyance path 18 is conveyed in the paper conveyance direction 35. After passing between the second lower conveyance roller 16 and the second upper conveyance roller 17, the medium that is conveyed on the conveyance path 18 is supplied to the image capturing unit 7.

Contact Structures

Figure 3:
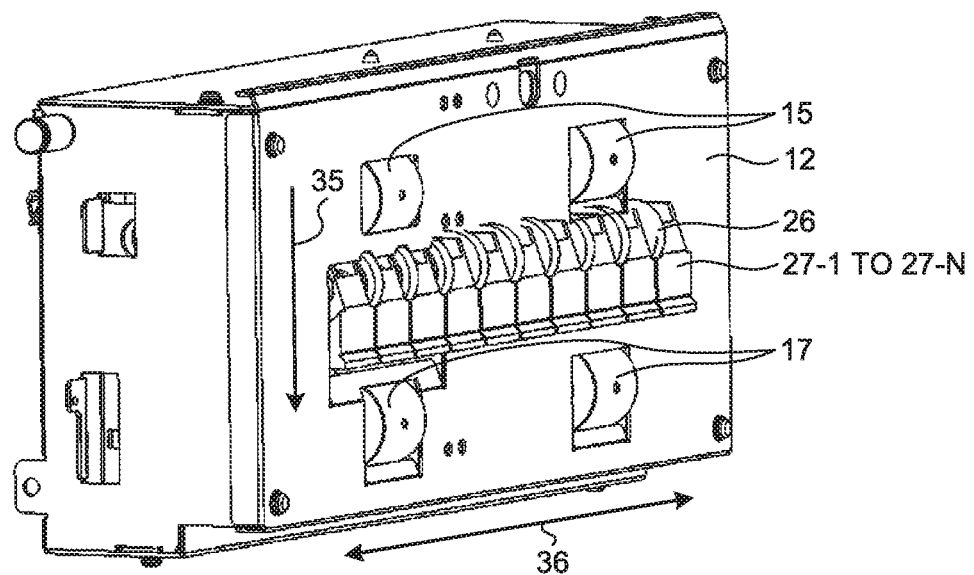
FIG. 3 is perspective view of a plurality of contact structures.

FIG. 3 is a perspective view of the contact structures. As illustrated in FIG. 3, the contact structures 27-1 to 27-N are formed similarly to one another and are arranged in an array at equal intervals in a lateral direction 36. The lateral direction 36 is parallel to the rotation axis 22 of the first upper conveyance roller 15. Each of a plurality of circular plates that form the rollers 26 is arranged between adjacent two of the contact structures 27-1 to 27-N.

Figure 4:
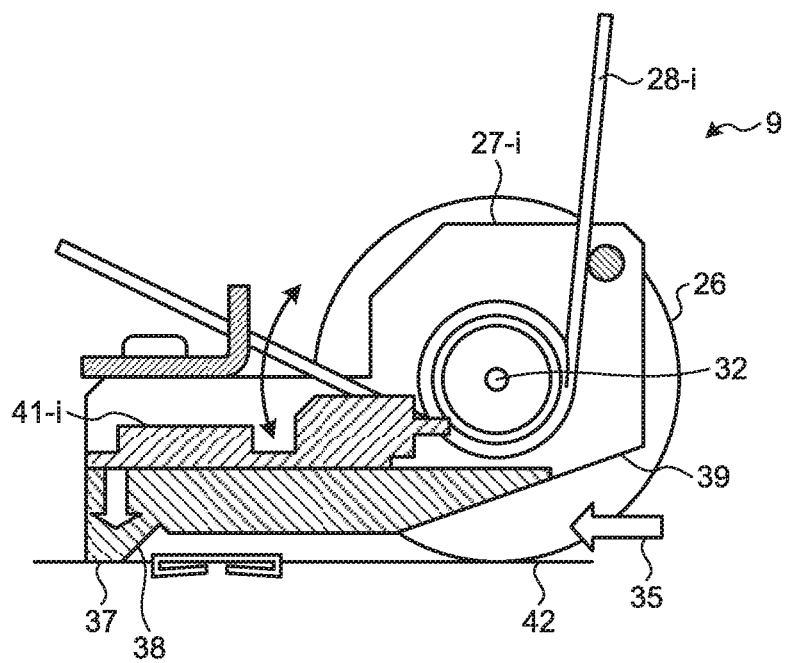
FIG. 4 is a side view of one of the contact structures.

FIG. 4 is a side view of one of the contact structures. As illustrated in FIG. 4, each contact structure 27-$i$ (i=1, 2, 3, ..., n) of the contact structures 27-1 to 27-N is supported by the device frame such that contact structure 27-$i$ is pivotable on the rotation axis 32. Thus, when the rotation axis 32 goes up or down, the contact structure 27-$i$ accordingly moves up or down. In other words, the contact structure 27-$i$ moves up or down in synchronization with moving up or down of the roller 26.

In the contact structure 27-$i$, a contact surface 37, a fastening member taper surface 38, and a medium taper surface 39 are formed. The contact surface 37 is formed flat and is formed in a lower part of the contact structure 27-$i$ such that the contact surface 37 is opposed to the lower conveyance guide 11. The fastening member taper surface 38 is formed approximately flat, is arranged on an opposite side to the contact surface 37 in the paper conveyance direction 35 in the contact structure 27-$i$, and is formed such that the fastening member taper surface 38 is adjacent to the contact surface 37. The fastening member taper surface 38 is formed such that the direction toward which the fastening member taper surface 38 faces is inclined with respect to the direction toward which the contact surface 37 faces and the fastening member taper surface 38 faces toward the opposite direction of the paper conveyance direction 35. An angle of 45 degrees is exemplified as the angle that is formed by the fastening member taper surface 38 and the contact surface 37. The medium taper surface 39 is formed approximately flat and is arranged on an opposite side to the fastening member taper surface 38 in the paper conveyance direction 35 in the contact structure 27-$i$. The medium taper surface 39 is arranged such that the distance between the lower conveyance guide 11 and the medium taper surface 39 is longer than the distance between the lower conveyance guide 11 and the fastening member taper surface 38. The medium taper surface 39 is formed such that the direction toward which the fastening member taper surface 38 faces is inclined with respect to the direction toward which the contact surface 37 faces and the fastening member taper surface 38 faces toward the opposite direction of the paper conveyance direction 35. An angle of 20 degrees is exemplified as the angle that is formed by the medium taper surface 39 and the contact surface 37.

Furthermore, the contact structure 27-$i$ is formed such that the distance between a plane surface 42 along the contact surface 37 and the rotation axis 32 is equal to the distance between the outer circumferential surface of the roller 26 and the rotation axis 32. In other words, the contact structure 27-$i$ is formed such that the contact surface 37 is along the flat surface contacting the outer circumferential surface of the roller 26.

A spring 28-$i$ corresponding to the contact structure 27-$i$ among the springs 28-1 to 28-N is formed of an elastic member. One end of the spring 28-$i$ is fixed to the contact structure 27-$i$ and the other end of the spring 28-$i$ is fixed to the device frame. The spring 28-$i$ applies an elastic force to the contact structure 27-$i$ such that the contact surface 37 gets close to the lower conveyance guide 11, that is, such that the lower conveyance guide 11 rotates counterclockwise as illustrated FIG. 4 on the rotation axis 32. A force between about 50 gf and about 100 gf is exemplified as a force of the spring 28-$i$ to cause the contact surface 37 of the contact structure 27-$i$ to get close to the lower conveyance guide 11.

The sensor unit 9 further includes a vibration sensor 41-$i$. The vibration sensor 41-$i$ is fixed to the contact structure 27-*i*. The vibration sensor 41-*i* includes a piezoelectric element and, when the contact structure 27-*i* vibrates, the piezoelectric element generates an electric signal corresponding to the vibration of the contact structure 27-*i*.

When the medium that is conveyed on the conveyance path 18 passes between the roller 26 and the roller 25, the medium contacts the outer circumferential surface of the roller 26 and thus the rotation axis 32 moves up to a level corresponding to the thickness of the medium. The fore-end of the medium may contact the medium taper surface 39 of the contact structure 27-*i*. After the fore-end of the medium conveyed on the conveyance path 18 contacts the medium taper surface 39, the fore-end of the medium slides on the medium taper surface 39 and thus the medium taper surface 39 smoothly guides the fore-end of the medium to the fastening member taper surface 38.

After the medium passes between the roller 26 and the roller 25, the fore-end of the medium that is conveyed on the conveyance path 18 contacts the fastening member taper surface 38 of the contact structure 27-*i*. After the fore-end of the medium conveyed on the conveyance path 18 contacts the fastening member taper surface 38, the fore-end slides on the fastening member taper surface 38 and accordingly is guided smoothly to the contact surface 37. When the medium conveyed on the conveyance path 18 is thick, the fore-end of the medium slides on the fastening member taper surface 38 and accordingly the fore-end of the medium gently pushes up the fastening member taper surface 38 of the contact structure 27-*i* to cause the contact structure 27-*i* to pivot (clockwise in FIG. 4) on the rotation axis 32.

After passing between the roller 26 and the roller 25, the top surface of the medium, which is conveyed on the conveyance path 18, opposed to the upper conveyance guide 12 contacts the contact surface 37 of the contact structure 27-*i* and the top surface of the medium slides on the contact surface 37. The contact structure 27-*i* is formed such that the distance between the plane surface 42 and the rotation axis 32 is equal to the distance between the outer circumferential surface of the roller 26 and the rotation axis 32 and thus the contact surface 37 can adhere to the top surface of a medium having any thickness.

Figure 5:
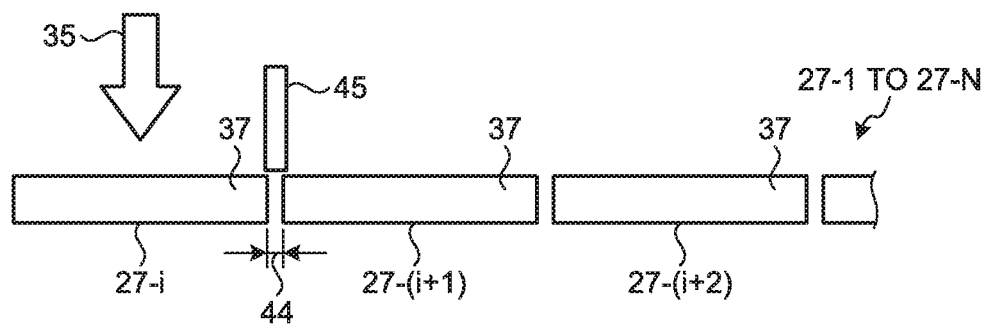
FIG. 5 is a plane view of a contact surface of the contact structure.

FIG. 5 is a plane view of the contact surface of the contact structure. As illustrated in FIG. 5, the contact surface 37 of each of the contact structures 27-1 to 27-N is formed in an oblong. A clearances 44 is formed between a contact structure 27-*i* and a contact structure 27-(*i*+1) of the contact structures 27-1 to 27-N such that the contact structures 27-1 to 27-N pivot independently from one another about the rotation axis 32. The width of the clearance 44 is smaller than the minimum value of the diameter of a staple 45, that is, smaller than the thickness of the staple 45. The clearances 44 are provided between the contact structures 27-1 to 27-N and thus the staple 45 bumps at least one of the contact structures 27-1 to 27-N even when the staple 45 that fastens the medium conveyed on the conveyance path 18 is arranged in parallel with the paper conveyance direction 35.

Fastening Member Detection Device

Figure 6:
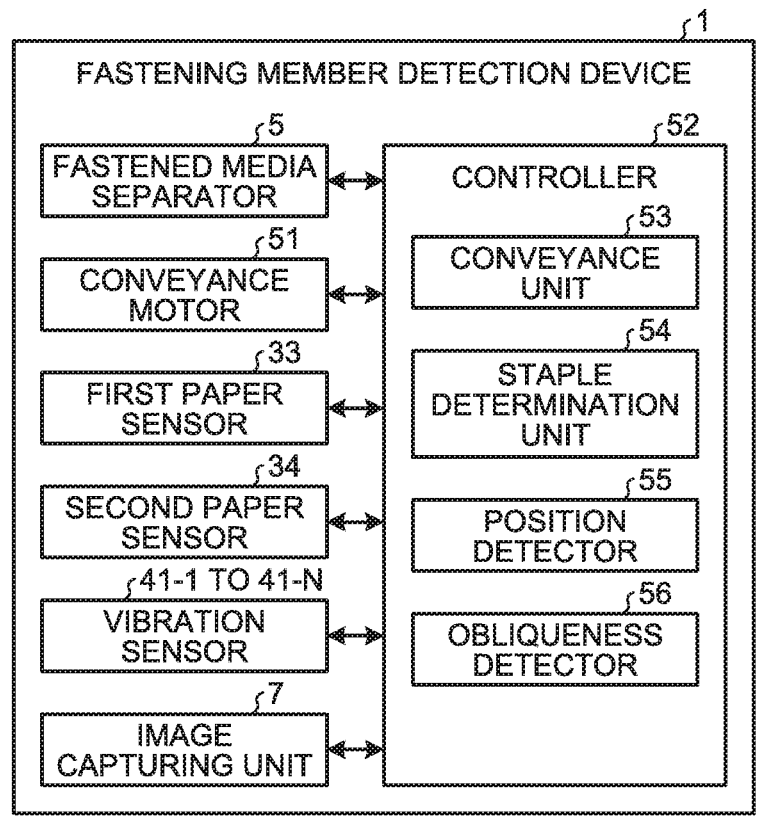
FIG. 6 is a block diagram of the fastening member detection device.

FIG. 6 is a block diagram of the fastening member detection device. As illustrated in FIG. 6, the fastening member detection device 1 further includes a plurality of vibration sensors 41-1 to 41-N, a conveyance motor 51, and a controller 52. The vibration sensors 41-1 to 41-N correspond respectively to the contact structures 27-1 to 27-N and contain the above-described vibration sensor 41-*i*. The vibration sensor 41-*i* corresponding to the contact structure 27-*i* of the vibration sensors 41-1 to 41-N is controlled by the controller 52 and thus detects a vibration occurring in the contact structure 27-*i* and transmits an electric signal corresponding to the vibration to the controller 52. The conveyance motor 51 is controlled by the controller 52 and thus causes the first lower conveyance roller 14, the first upper conveyance roller 15, the second lower conveyance roller 16, and the second upper conveyance roller 17 to rotate normally.

The controller 52 is a so-called computer and includes a central processing unit (CPU) and a storage device that are not illustrated in the drawings. By executing a computer program that is installed in the controller 52, the CPU controls the storage device. By executing the computer program, the CPU further controls the fastened media separator 5, the conveyance motor 51, the first paper sensor 33, the second paper sensor 34, the vibration sensors 41-1 to 41-N, and the image capturing unit 7. The storage device records the computer program and records information that is used by the CPU.

The computer program that is installed in the controller 52 is formed of a plurality of computer programs that cause the controller 52 to implement a plurality of functions, respectively. The functions contain a conveyance unit 53, a staple determination unit 54, a position detector 55 and an obliqueness detector 56.

The conveyance unit 53 controls the fastened media separator 5 such that the media supplied to the fastening member automatic removal device 2 are supplied one by one to the contact detector 6. The conveyance unit 53 controls the conveyance motor 51 such that, when a medium is supplied from the fastened media separator 5 to the contact detector 6, the first lower conveyance roller 14 and the first upper conveyance roller 15, the second lower conveyance roller 16, and the second upper conveyance roller 17 rotate normally at given angular velocities, respectively. In other words, the conveyance unit 53 controls the conveyance motor 51 such that the medium supplied from the fastened media separator 5 to the contact detector 6 is conveyed in the paper conveyance direction 35 on the conveyance path 18 at a given velocity and such that the medium is supplied to the image capturing unit 7.

The staple determination unit 54 controls the first paper sensor 33 such that, when the conveyance unit 53 conveys the medium on the conveyance path 18, sets of timing at which the fore-end and the rear-end of the medium conveyed on the conveyance path 18 passes near the first paper sensor 33 are detected. The staple determination unit 54 further controls the second paper sensor 34 such that, when the conveyance unit 53 conveys the medium on the conveyance path 18, sets of timing at which the fore-end and rear-end of the medium conveyed on the conveyance path 18 pass near the second paper sensor 34 are detected.

The staple determination unit 54 controls the vibration sensors 41-*a* to 41-N such that, when the conveyance unit 53 conveys the medium on the conveyance path 18, a plurality of vibrations occurring respectively in the contact structures 27-1 to 27-N are detected. The staple determination unit 54 further determines whether there is a staple that fastens the medium conveyed on the conveyance path 18 based on the detected sets of timing and the vibrations.

When the staple determination unit 54 determines that there is a staple, the position detector 55 calculates a detection area where the staple is arranged in the medium conveyed on the conveyance path 18 based on the sets of timing and the vibrations that are detected by the staple determination unit 54.

When the staple determination unit 54 determines that there is a staple, the obliqueness detector 56 controls the image capturing unit 7 such that an image of the area calculated by the position detector 55 is captured. The obliqueness detector 56 performs image processing on the captured image to calculate a position in which the staple is arranged and the direction (obliqueness) in which the staple is.

Operations of Fastening Member Detection Device

Figure 7:
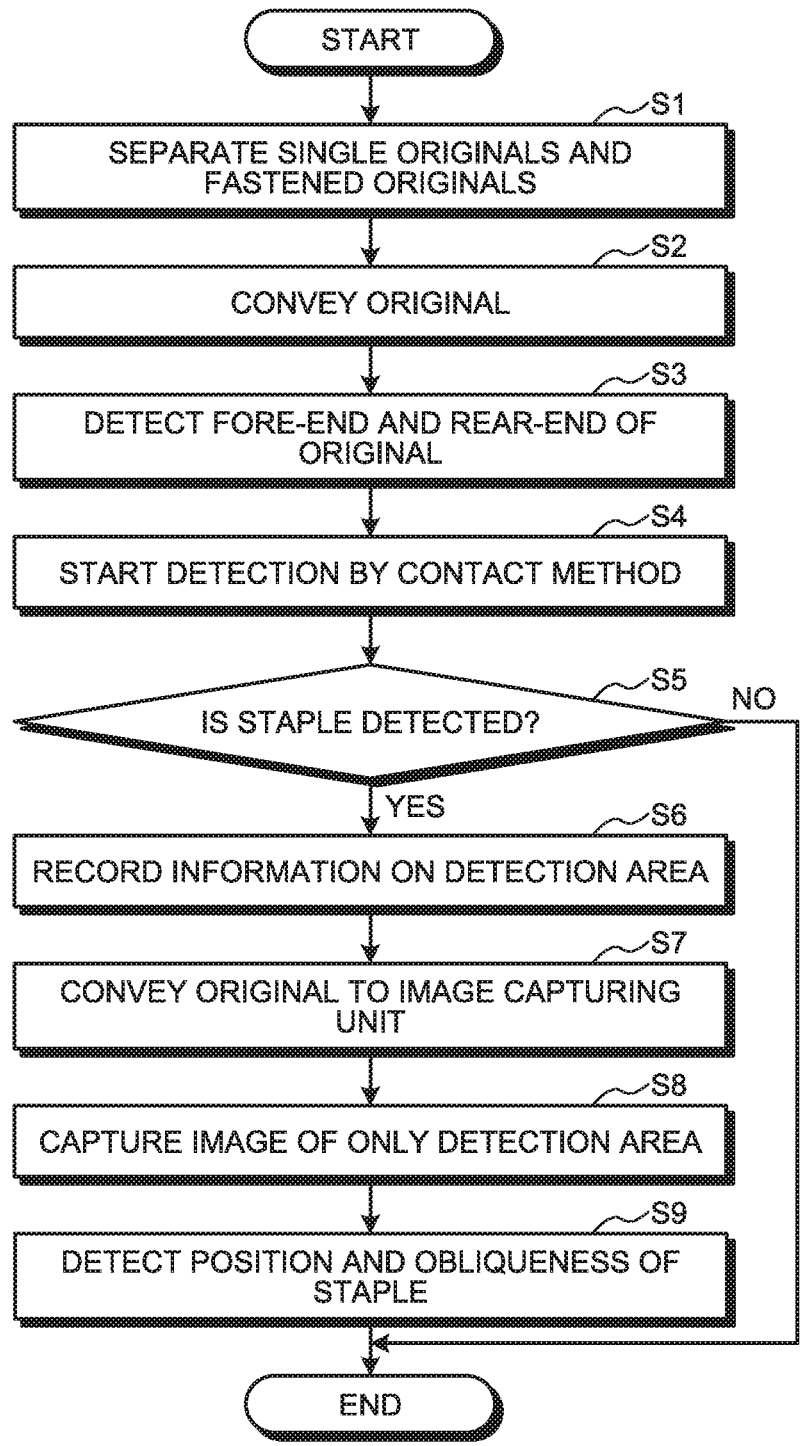
FIG. 7 is a flowchart of operations of the fastening member detection device.

FIG. 7 is a flowchart illustrating operations of the fastening member detection device. When started by an operation of a user, first of all, as illustrated in FIG. 7, the controller 52 of the fastening member detection device 1 controls the fastened media separator 5 to supply a plurality of media that are supplied to the fastening member automatic removal device 2 to the contact detector 6 one by one (step S1). When a medium is supplied from the fastened media separator 5 to the contact detector 6, the controller 52 controls the conveyance motor 51 to convey the medium such that the medium passes on the conveyance path 18 at a given velocity in the paper conveyance direction 35 (step S2).

When the medium is supplied from the fastened media separator 5 to the contact detector 6, the controller 52 further controls the first paper sensor 33 to detect timing at which the fore-end of the medium passes near the first paper sensor 33 on the conveyance path 18. The controller 52 controls the second paper sensor 34 to detect timing at which the fore-end of the medium passes near the second paper sensor 34 on the conveyance path 18. The controller 52 controls the first paper sensor 33 to detect timing at which the rear-end of the medium passes near the first paper sensor 33 on the conveyance path 18. The controller 52 controls the second paper sensor 34 to detect timing at which the rear-end of the medium passes near the second paper sensor 34 on the conveyance path 18. Based on the detected sets of timing, the controller 52 calculates a period during which the contact structures 27-1 to 27-N may contact a staple that fastens the medium (step S3).

When it is detected that the fore-end of the medium passes near the first paper sensor 33 on the conveyance path 18, the controller 52 controls the vibration sensors 41-1 to 41-N to detect a plurality of vibrations that occur in the contact structures 27-1 to 27-N, respectively (step S4). When it is detected that the rear-end of the medium passes near the second paper sensor 34 on the conveyance path 18, the controller 52 stops detection of the vibrations by the vibration sensors 41-1 to 41-N. Based on the vibrations that are detected by the vibration sensors 41-1 to 41-N during the period that is calculated at step S3, the controller 52 detects whether there is a staple that fastens the medium (step S5).

When it is detected that there is a staple (YES at step S5), the controller 52 calculates a detection area in which the staple is arranged on the surface of the medium based on the detected vibrations and records the calculated detection area in the storage device (step S6). The controller 52 further controls the conveyance motor 51 to supply the medium to the image capturing unit 7 (step S7).

When the medium is supplied from the contact detector 6 to the image capturing unit 7, the controller 52 controls the image capturing unit 7 to capture an image of the detection area, which is calculated at step 6, on the surface of the medium (step S8). The controller 52 performs image processing on the captured image to calculate a position in which the staple that fastens the medium is arranged and an obliqueness of the staple (step S9). When the fastening member detection device 1 detects that there is the staple on the medium, the fastening member removal device 3 removes the staple from the medium based on the position and obliqueness of the staple that are detected at step S9.

When it is not detected that there is a staple that fastens the medium (NO at step S5), the controller 52 ends the processing without calculating a position and an obliqueness of the medium. Such operations are repeated for each of the media that are supplied to the fastening member automatic removal device 2 and are repeatedly executed for the number of times equal to the number of media that are supplied to the fastening member automatic removal device 2.

Figure 8:
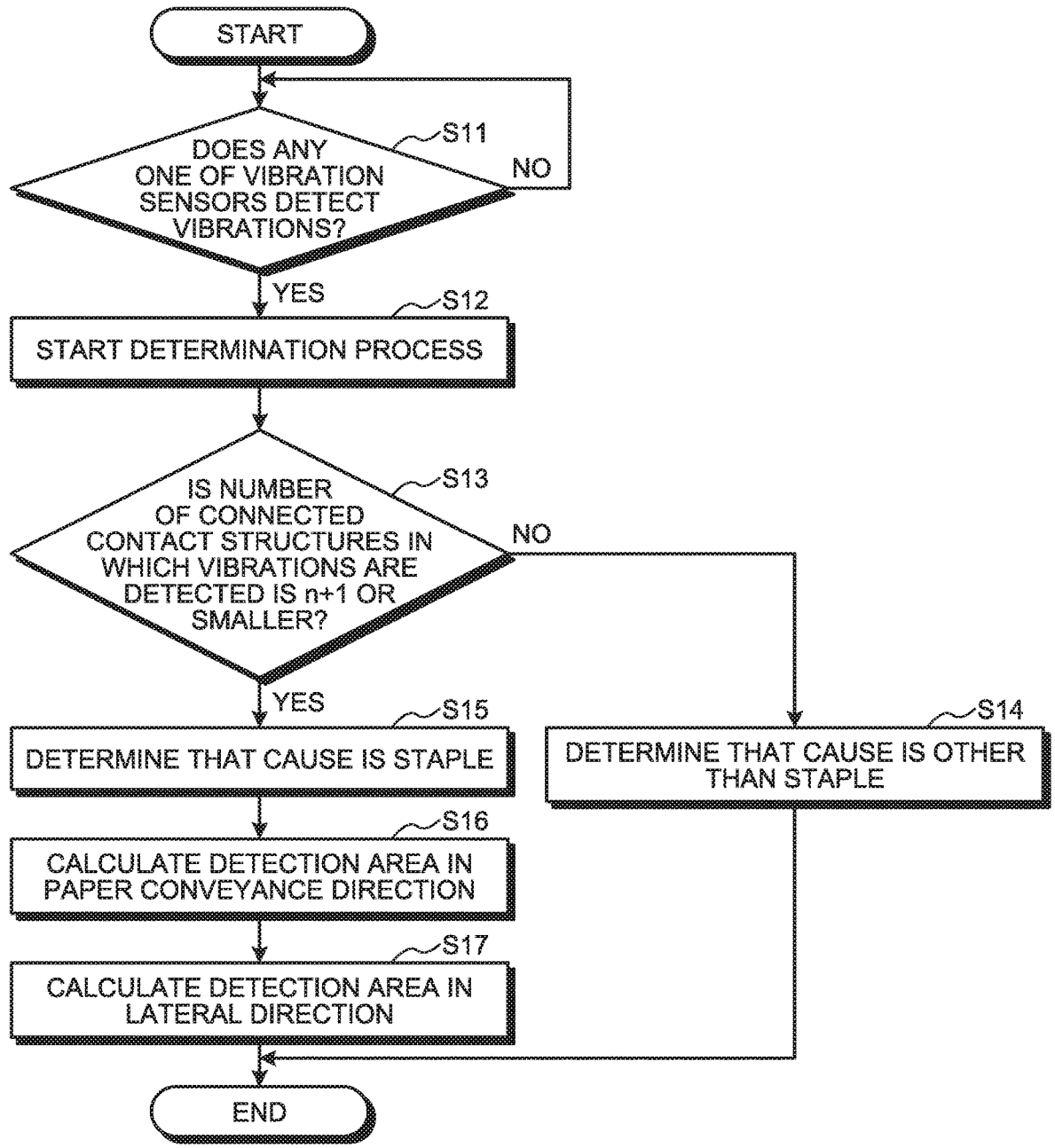
FIG. 8 is a flowchart of operations of detecting whether there is a fastening member.

FIG. 8 is a flowchart of operations to detect whether there is a fastening member. FIG. 8 shows the processing of steps S4 to S6 in FIG. 7. As illustrated in FIG. 8, first of all, the controller 52 of the fastening member detection device 1 repeatedly determines whether a given vibration that meets a given condition is detected from the vibrations that are detected by the vibration sensors 41-1 to 41-N, respectively (step S11). When the given vibration is detected (YES at step S11), the controller 52 starts processing to determine whether there is a staple (step S12).

The controller 52 calculates contact structures in which the given vibration occurs among the contact structures 27-1 to 27-N and calculates the number of the calculated contact structures connected in the lateral direction 36 (step S13). When the number of the connected contact structures is (n+2) or larger (NO at step S13), the controller 52 determines that the vibrations are caused by a cause other than a staple (step S14).

When the number of the connected contact structures is (n+1) or smaller (YES at step S13), the controller 52 determines that the vibrations are caused by a staple (step S15). Based on the detected vibrations, the controller 52 calculates a position in the detection area in which the staple is arranged on the medium in the paper conveyance direction 35 (step S16). Based on the contact structures in which the given vibrations occur among the contact structures 27-1 to 27-N, the controller 52 further calculates the position in the detection area in which the staple is arranged on the medium in the lateral direction 36 (step S17). The controller 52 records the calculated positions in the detection area in the paper conveyance direction 35 and in the lateral direction 36 in the storage device.

Figure 9:
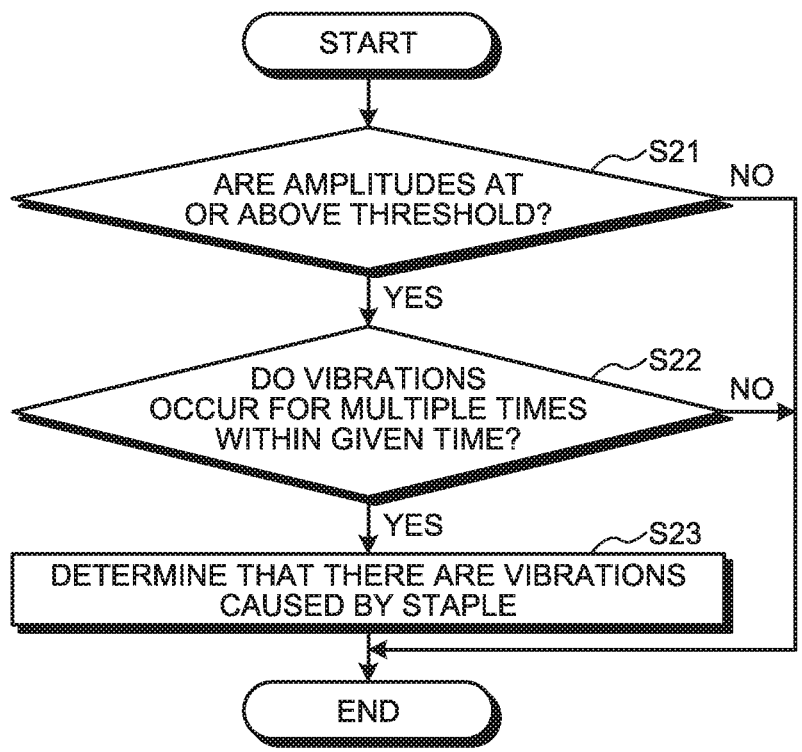
FIG. 9 is a flowchart of the operations of detecting whether there is a fastening member.

FIG. 9 is a flowchart of operations to detect whether there is a fastening member. FIG. 9 represents the processing at step S11 in the flowchart in FIG. 8. When the vibration sensors 41-1 to 41-N detect the vibrations, respectively, as illustrated in FIG. 9, the controller 52 determines whether each of the vibrations contains vibration whose amplitude is at or above a threshold (step S21). When it is determined that vibration whose amplitude is at or above the threshold are not contained (NO at step S21), the controller 52 determines that there is not any staple fastening the medium.

When it is determined that vibration whose amplitude is at or above the threshold is contained (YES at step S21), the controller 52 determines whether there are vibrations whose amplitudes are at or above the threshold for a plurality of times within a given time (step S22). When there are not the vibrations for a plurality of times within the given time (NO at step S22), the controller 52 determines that there is not any staple fastening the medium. When there are the vibrations for a plurality of times within the given time (YES at step S22), the controller 52 determines that there is a staple fastening the medium (step S23).

Figure 10:
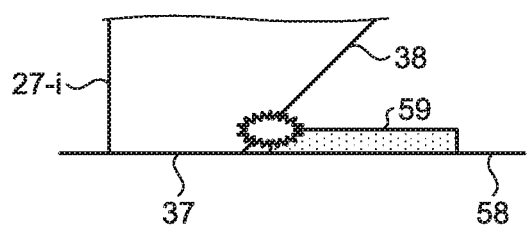
FIG. 10 is a side view of a contact structure that slides on an area where a staple is arranged in a medium.

FIG. 10 is a side view of the contact structure that slides on the area in which the staple is arranged on the medium. As illustrated in FIG. 10, a medium 58 is conveyed on the conveyance path 18 and accordingly the contact structure 27-$i$ moves with respect to the medium 58 with its contact surface 37 contacting the surface of the medium 58. While the medium 58 is being conveyed on the conveyance path 18, the fastening member taper surface 38 of the contact structure 27-*i* may bump against a staple 59 fastening the medium 58. The bump of the fastening member taper surface 38 against the staple 59 causes the contact structure 27-*i* to be flipped up by the staple 59. After being flipped up, the elastic force of the spring 28-*i* and the force of the medium to push the contact structure 27-*i* up serve as a force of restitution and accordingly the contact structure 27-*i* vibrates with amplitudes equal to or larger than a given amplitude at frequencies in a given band.

The fastening member taper surface 38 is oblique to the vertical direction and thus, after the staple 59 flips the contact structure 27-*i* up, the medium 58 is conveyed on the conveyance path 18 and accordingly the staple 59 slides on the fastening member taper surface 38. After the staple 59 slides on the fastening member taper surface 38, the medium 58 is conveyed on the conveyance path 18 and accordingly the staple 59 slides on the contact surface 37. After the staple 59 slides on the contact surface 37, the medium 58 is conveyed on the conveyance path 18 and accordingly the contact structure 27-*i* falls from the staple 59 onto the surface of the medium 58. After falling from the staple 59 onto the surface of the medium 58, the elastic force of a spring 28-*i* and the force of the medium to push up the contact structure 27-*i* serve as the force of restitution and thus the contact structure 27-*i* vibrates again with amplitudes equal to or larger than the given amplitude at frequencies in the given band.

Figure 11:
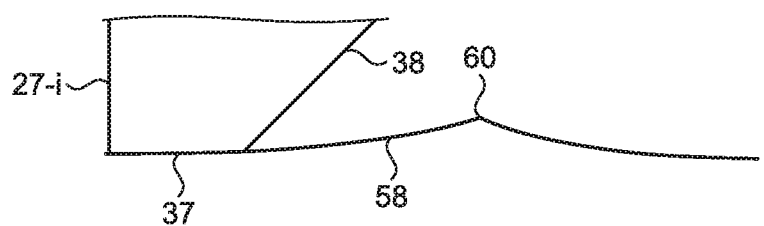
FIG. 11 is a side view of a contact structure that slides on an area where a gentle step is formed in the medium.

FIG. 11 is a side view of the contact structure that slides on an area where a gentle step is formed in the medium. As illustrated in FIG. 11, a gentle step 60 is formed partly in the medium 58. A fold that is formed because the medium 58 is bent is exemplified as the step 60. When the contact surface 37 slides on the area where the step 60 is formed on the medium 58, nothing bumps against the fastening member taper surface 38 and the contact structure 27-*i* is not flipped up. For this reason, even when the contact structure 27-*i* slides on the area where the step 60 is formed on the medium 58, vibrations with amplitudes equal to or larger than the given amplitude do not occur. Accordingly, when the contact structure 27-*i* slides on an area where the staple 59 is not arranged, vibrations whose amplitudes are equal to or larger than the given amplitude do not occur.

Figure 12:
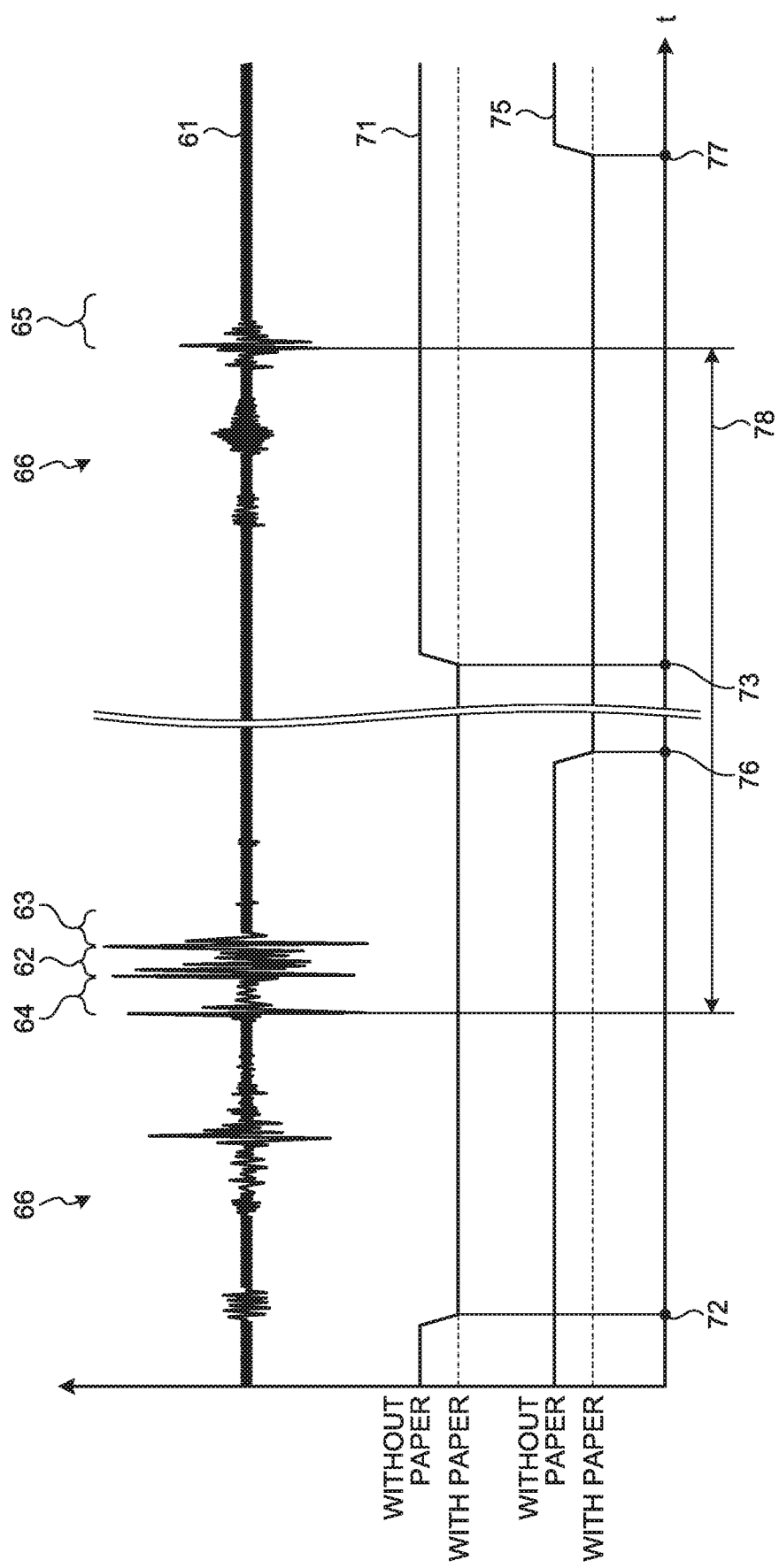
FIG. 12 is a graph of vibration that occurs in the contact structure that bumps against the staple, representing results of detection by a first paper sensor and a second paper sensor.

FIG. 12 is a graph of vibration that occur in the contact structure that bumps against the staple and representing results of detection by the first paper sensor and the second paper sensor. A waveform 61 on the graph represents vibration that occur in the contact structure 27-*i* that bumps against the staple among the contact structures 27-1 to 27-N and represents vibration that are detected by the vibration sensor 41-*i*. The waveform 61 represents that a plurality of vibrations occur in the contact structure 27-*i*. The vibrations contain vibration 62, vibration 63, vibration 64, vibration 65 and vibration 66. The vibration 62 represents vibration that occurs because the staple that fastens the medium conveyed on the conveyance path 18 bumps against the contact structure 27-*i*. The vibration 63 represents vibration that occurs because the staple fastening the medium conveyed on the conveyance path 18 separates from the contact structure 27-*i*. The vibration 64 represents vibration that occurs because the fore-end of the medium conveyed on the conveyance path 18 bumps against the contact structure 27-*i*. The vibration 65 represents vibration that occurs because the rear-end of the medium conveyed on the conveyance path 18 separates from the contact structure 27-*i*. The vibration 66 represents vibrations that occur because of noises. Vibrations that occur when the contact surface 37 of the contact structure 27-*i* slides on the surface of the medium and vibrations that are transmitted to the contact structure 27-*i* from parts of the fastening member automatic removal device 2 other than the contact structure 27-*i* are exemplified as noises. The waveform 61 represents that the amplitudes of the vibration 62 and the vibration 63 are at or above the given threshold.

A curve 71 represents a result of detection of the medium by the first paper sensor 33. The curve 71 represents that the fore-end of the medium conveyed passes near the first paper sensor 33 at a time 72 at which the curve 71 changes such that the medium is detected. The curve 71 represents that the rear-end of the medium conveyed passes near the first paper sensor 33 at a time 73 at which the curve 71 changes such that the medium is not detected. A curve 75 represents a result of detection of the medium by the second paper sensor 34. The curve 75 represents that the fore-end of the medium conveyed passes near the second paper sensor 34 at a time 76 at which the curve 75 changes such that the medium is detected. The curve 75 represents that the rear-end of the medium conveyed passes near the second paper sensor 34 at a time 77 at which the curve 75 changes such that the medium is not detected.

The curve 71 and the curve 75 represent that the contact structure 27-*i* contacts the medium during a period 78 that is calculated from the time 72, the time 73, the time 76 and the time 77. In other words, the curve 71 and the curve 75 represent that there is a possibility that the contact structure 27-*i* may bump against the staple that fastens the medium during the period 78.

The waveform 61 represents that the vibration 62 and the vibration 63 occur during the given period 78. The waveform 61 represents that the vibration 64 occur at the time of start of the given period 78. The waveform 61 represents that the vibration 65 occur at the time of end of the given period 78. In other words, the waveform 61 represents that whether there is a staple is detected based on the vibrations occurring in the given period 78 and thus the fastening member detection device 1 does not falsely detect the fore-end or rear-end of the medium as a staple.

Figure 13:
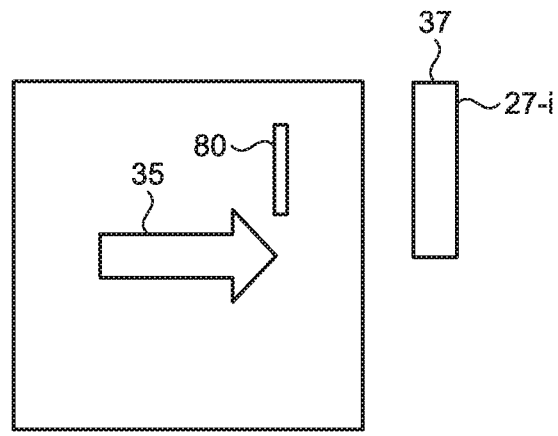
FIG. 13 is a plane view of a staple that bumps against a contact structure.

FIG. 13 is a plane view of a staple that bumps against a contact structure. As illustrated in FIG. 13, a staple 80 is arranged along a straight line perpendicular to the paper conveyance direction 35. The diameter of the staple 80 in the paper conveyance direction 35 is relatively short and is approximately equal to the thickness of the staple 80.

Figure 14:
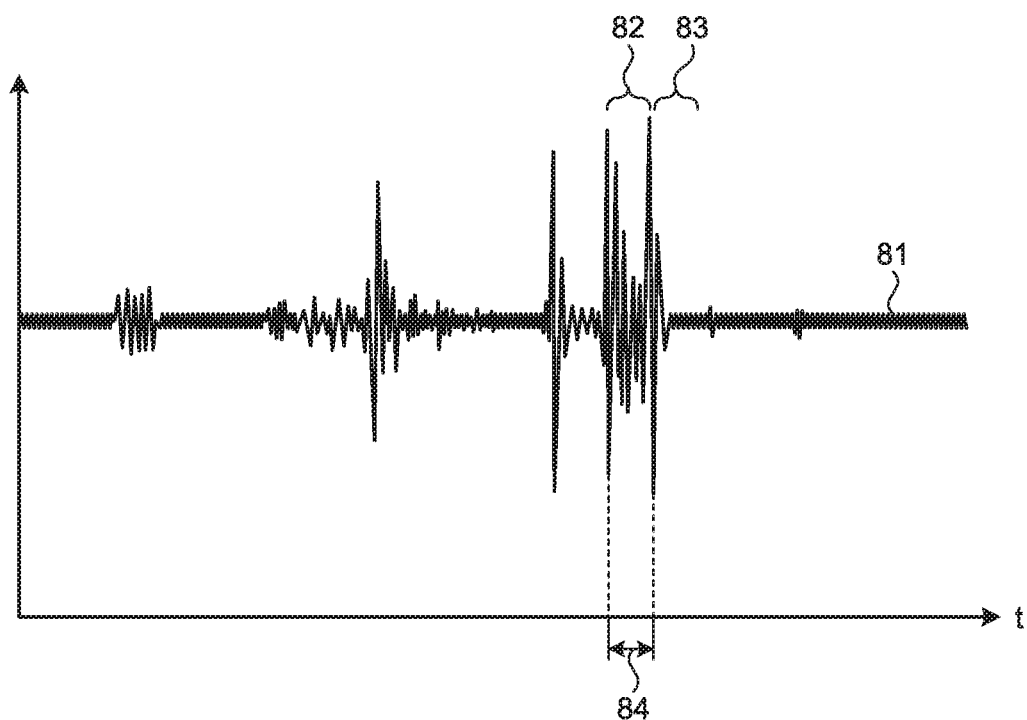
FIG. 14 is a graph of vibration that occurs in a contact structure that bumps against a staple that is perpendicular to a paper conveyance direction.

FIG. 14 is a graph of vibration that occurs in the contact structure that bumps against the staple perpendicular to the paper conveyance direction. A waveform 81 represents vibrations that occur in the contact structure 27-*i* that bumps against the staple 80 among the contact structures 27-1 to 27-N. The waveform 81 represents that the vibrations that occur in the contact structure 27-*i* contain vibration 82 that occur because the staple 80 bumps against the contact structure 27-*i* and vibration 83 that occur because the staple 80 separates from the contact structure 27-*i*. A time 84 from the time at which the vibration 82 occurs until the time at which the vibration 83 occurs corresponds to the diameter of the staple 80 in the paper conveyance direction 35. The waveform 81 represents that the time 84 is relatively short.

Figure 15:
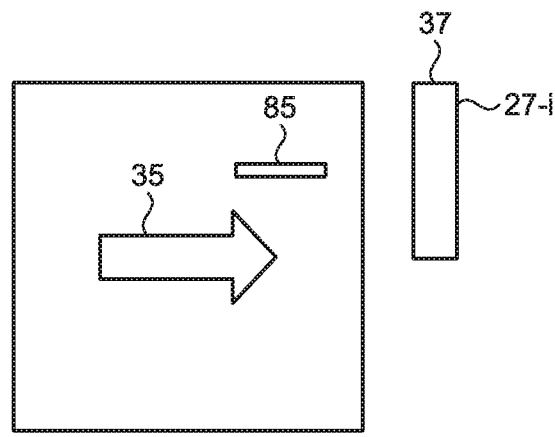
FIG. 15 is a plane view of another staple that bumps against a contact structure.

FIG. 15 is a plane view of another staple that bumps against the contact structure. As illustrated in FIG. 15, a staple 85 is arranged along a straight line that is parallel to the paper conveyance direction 35. The diameter of the staple 85 in the paper conveyance direction 35 is relatively long and is approximately equal to the length of the staple 85.

Figure 16:
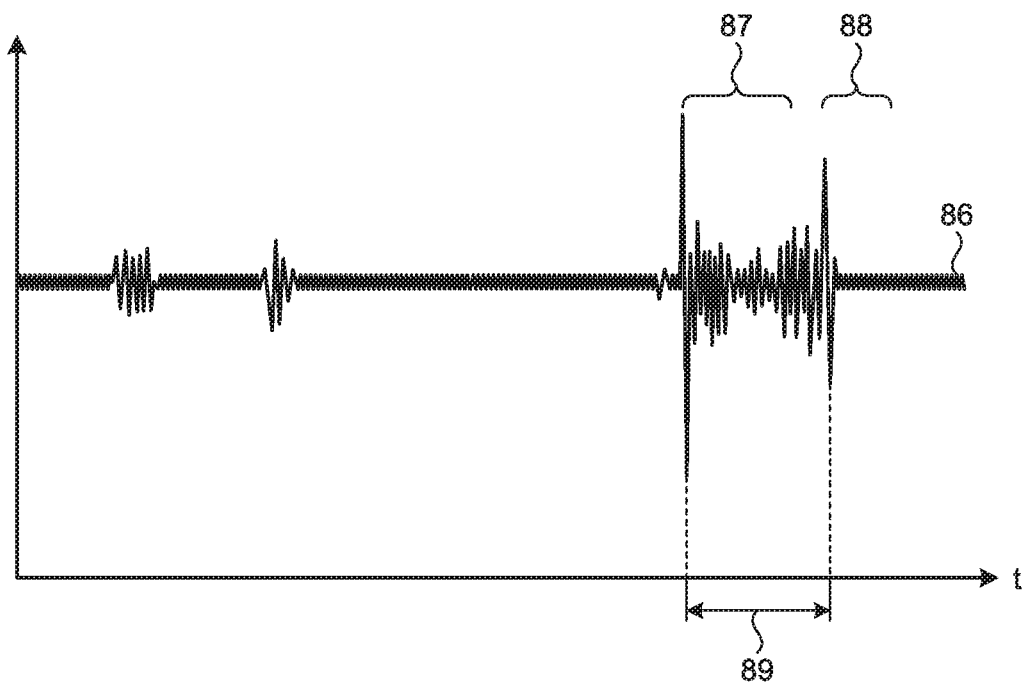
FIG. 16 is a graph of vibration that occurs in a contact structure that bumps against a staple that is parallel to the paper conveyance direction.

FIG. 16 is a graph of vibration that occurs in the contact structure that bumps against the staple that is parallel to the paper conveyance direction. A waveform 86 represents vibrations that occur in the contact structure 27-*i* that bumps against the staple 85 among the contact strictures 27-1 to 27-N. The waveform 86 represents that vibrations that occur in the contact structure 27-*i* contains vibration 87 that occur because the staple 85 bumps against the contact structure 27-*i* and vibration 88 that occurs because the staple 85 separates from the contact structure 27-*i*. A time 89 from the time at which the vibration 87 occurs until a time at which the vibration 88 occurs corresponds to the diameter of the staple in the paper conveyance direction 35. The waveform 86 further represents that the time 89 is longer than the time 84 in FIG. 14.

Figure 17:
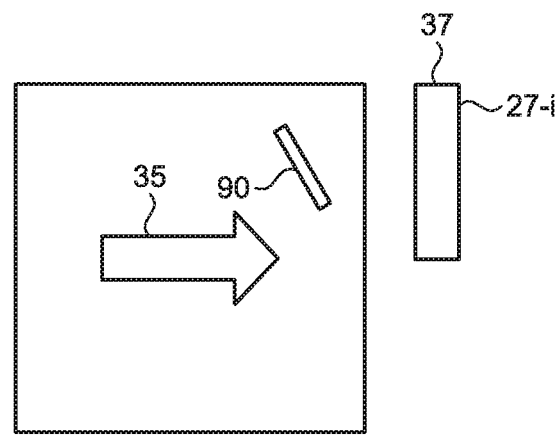
FIG. 17 is a plane view of still another staple that bumps against a contact structure.

FIG. 17 is a plane view of still another staple that bumps against the contact structure. As illustrated in FIG. 17, a staple 90 is arranged along a straight line that is oblique to the paper conveyance direction 35. In other words, the straight line is not parallel to the paper conveyance direction 35 and is not orthogonal to the paper conveyance direction 35. The diameter of the staple 90 in the paper conveyance direction 35 is longer than the width of the staple 80 in the paper conveyance direction 35 and is shorter than the diameter of the staple 85 in the paper conveyance direction 35.

Figure 18:
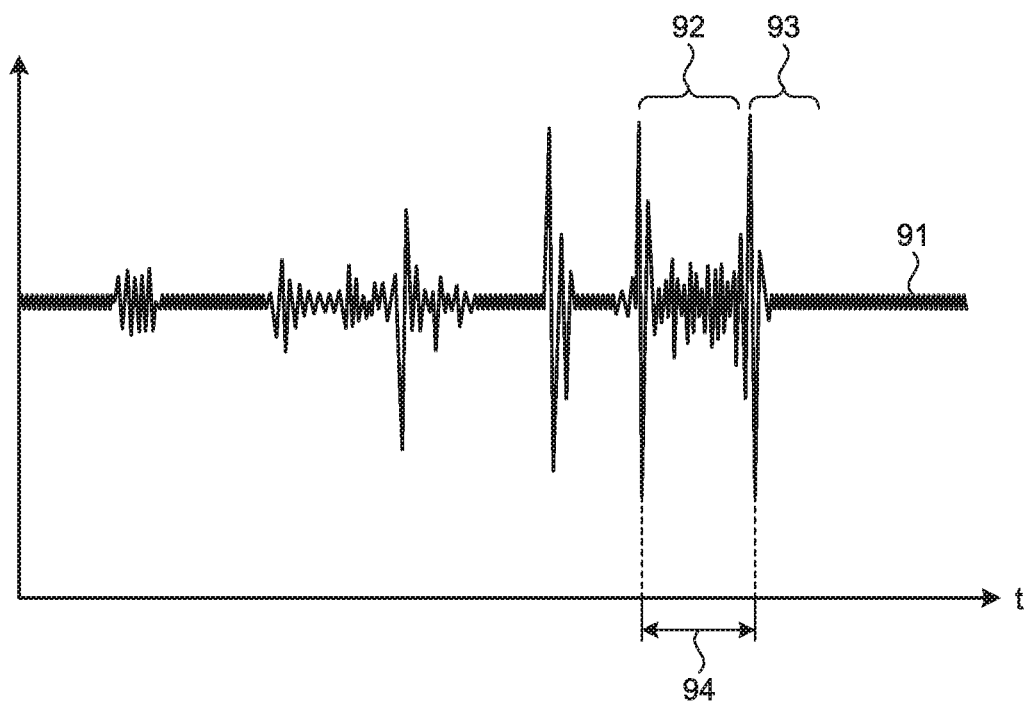
FIG. 18 is a graph of vibration that occurs in a contact structure that bumps against a staple that is oblique to the paper conveyance direction.

FIG. 18 is a graph of vibration that occurs in the contact structure that bumps against the staple that is oblique to the paper conveyance direction. A waveform 91 represents vibrations that occur in the contact structure 27-*i* that bumps against the staple 90 among the contact strictures 27-1 to 27-N. The waveform 91 represents that the vibrations that occur in the contact structure 27-*i* contain vibration 92 that occurs because the staple 90 bumps against the contact structure 27-*i* and vibration 93 that occur because the staple 90 separates from the contact structure 27-*i*. A time 94 from the time at which the vibration 92 occurs until the time at which the vibration 93 occurs corresponds to the diameter of the staple 90 in the paper conveyance direction 35. The waveform 91 further represents that the time 94 is longer than the time 84 in FIG. 14 and the time 94 is shorter than the time 89 in FIG. 16.

The waveform 81, the waveform 86 and the waveform 91 represent that, when the staple bumps against the contact structure 27-*i*, the staple causes two types of vibrations in the contact structure 27-*i* within a given time. The given time is represented using a conveyance velocity V, a contactor length W and a staple length L by the following expression:

$$(L+W) \div V$$

where the conveyance velocity V represents a velocity at which the medium is conveyed on the conveyance path 18, the contactor length W represents a width of the contact surface 37 in the paper conveyance direction 35, and the staple length L represents a maximum value of the length of the staple to be detected, that is, a maximum length of the staple to be detected. For example, when the conveyance velocity V is 150 mm/sec, the contactor length W is 3 mm and the staple length L is 9 mm, the given time is 0.08 second.

The given time is used as the given time that is used for the determination at step S22 in FIG. 9. The given time is used for the determination at step S22 and thus the controller 52 is prevented from falsely detecting an object other than staples to be detected as a staple. When the controller 52 detects two types of vibrations with an interval in between longer than the given time, the controller 52 determines that the two types of vibrations are not caused by a staple, thereby being prevented from falsely detecting an object other than staples to be detected as a staple. Preventing the controller 52 from falsely detecting an object other than staples as a staple enables proper detection on whether there is a staple.

Figure 19:
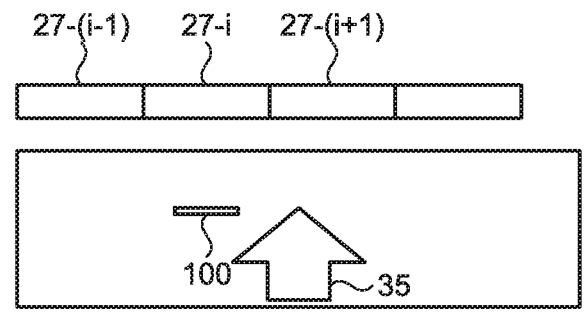
FIG. 19 is a plane view of a staple that bumps against one of the contact structures.

FIG. 19 is a plane view of a staple that bumps against one of the contact structures. As illustrated in FIG. 19, a staple 100 is arranged such that, when a medium is conveyed in the paper conveyance direction 35, the staple 100 bumps against the contact structure 27-*i* that is one of the contact structures 27-1 to 27-N. The staple 100 is arranged such that, when the medium is conveyed in the paper conveyance direction 35, the staple 100 does not bump against other contact structures 27-(*i*−1) and 27-(*i*+1) different from the contact structure 27-*i* among the contact structures 27-1 to 27-N.

Figure 20:
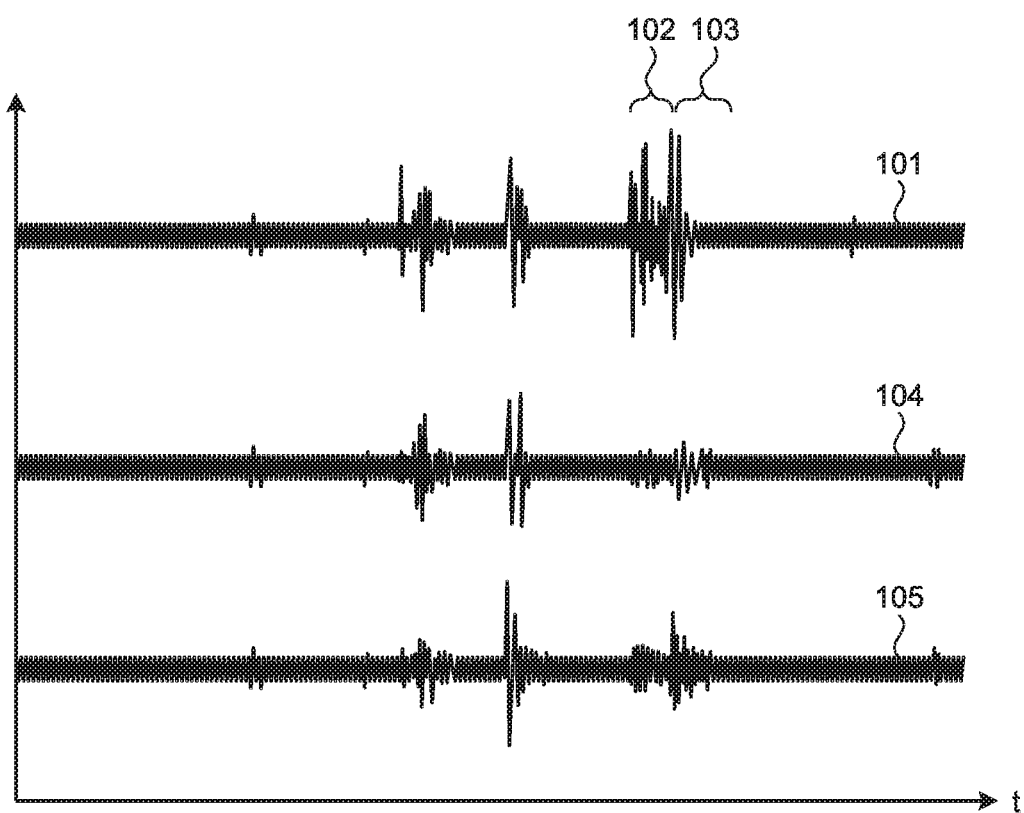
FIG. 20 is a graph of a plurality of vibrations that occur respectively in a plurality of contact structures when a staple bumps against one of contact structures.

FIG. 20 is a graph of a plurality of vibrations that occur in a plurality of contact structures, respectively, when one staple bumps against one of the contact structures. A waveform 101 represents vibrations that occur in the contact structure 27-*i* that bumps against the staple 100. The waveform 101 represents that the vibrations that occur in the contact structure 27-*i* contains vibration 102 that occur because the staple 100 bumps against the contact structure 27-*i* and vibration 103 that occur because the staple 100 separates from the contact structure 27-*i*. A waveform 104 represents vibrations that occur in the contact structure 27-(*i*+1) that does not bump against the staple 100. The waveform 104 represents that vibrations whose amplitudes are at or above the given threshold do not occur in the contact structure 27-(*i*+1). A waveform 105 represents vibrations that occur in the contact structure 27-(*i*−1) that does not bump against the staple 100. The waveform 105 represents that vibrations whose amplitudes are at or above the given threshold do not occur in the contact structure 27-(*i*−1).

A position of the detection area in the lateral direction 36 that is calculated at step S17 in FIG. 8 is calculated such that, when vibrations occur in the contact structure 27-*i* that is one of the structures and vibrations do not occur in the two contact structures on both sides of the contact structure 27-*i*, the position is equivalent to the center position in the contact structure 27-*i*. The detection area is calculated such that the width of the detection area in the lateral direction 36 is equal to the width of the contact structure 27-*i* in the lateral direction 36.

Figure 21:
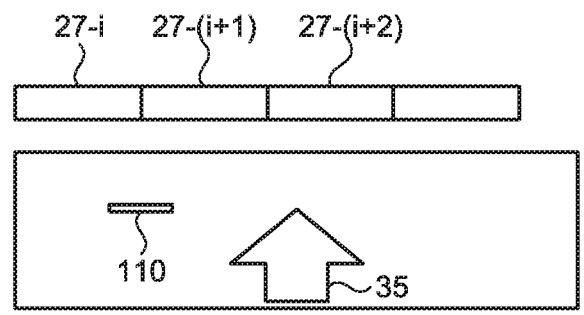
FIG. 21 is a plane view of a staple that bumps against a plurality of contact structures.

FIG. 21 is a plane view of a staple that bumps against a plurality of contact structures. As illustrated in FIG. 21, a staple 110 is arranged such that, when a medium is conveyed in the paper conveyance direction 35, the staple 110 bumps against the contact structures 27-*i* and 27-(*i*+1) that are two of the contact structures 27-1 to 27-N. The staple 110 is arranged such that, when the medium is conveyed in the paper conveyance direction 35, the staple 110 does not bump against another contact structure 27-(*i*+2) different from the contact structures 27-*i* and 27-(*i*+1) of the contact structures 27-1 to 27-N.

Figure 22:
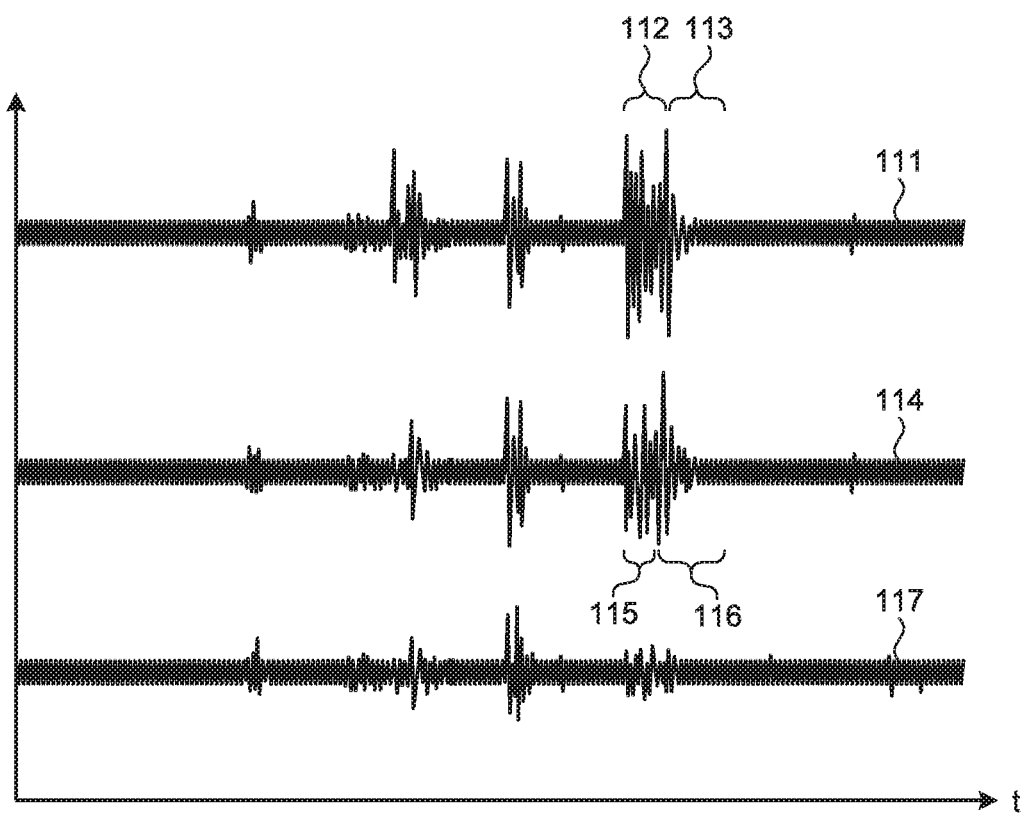
FIG. 22 is a graph of a plurality of vibrations that occur respectively in a plurality of contact structures when a staple bumps against a plurality of contact structures.

FIG. 22 is a graph of a plurality of vibrations that occur in the contact structures, respectively, when one staple bumps against a plurality of contact structures. A waveform 111 represents vibrations that occur in the contact structure 27-*i* that bumps against the staple 110. The waveform 111 represents that the vibrations that occur in the contact structure 27-*i* contain vibration 112 that occur because the staple 110 bumps against the contact structure 27-*i* and vibration 113 that occur because the staple 110 separates from the contact structure 27-$i$. A waveform 114 represents vibrations that occur in the contact structure 27-($i$+1) that bumps against the staple 110. The waveform 114 represents that the vibrations that occur in the contact structure 27-($i$+1) contains vibration 115 and vibration 116. The vibration 115 represents vibration that occurs because the staple 110 bumps against the contact structure 27-($i$+1). The vibration 116 represents vibration that occurs because the staple 110 separates from the contact structure 27-($i$+1). The waveform 111 and the waveform 114 represent that the period from the time when the vibration 112 occurs to the time when the vibration 113 occurs overlaps a period from the time when the vibration 115 occurs to the time when the vibration 116 occurs. A waveform 117 represents vibrations that occur in the contact structure 27-($i$+2) that does not bump against the staple 110. The waveform 117 represents that vibrations whose amplitudes are at or above the threshold do not occur in the contact structure 27-($i$+2).

The position of the detection area in the lateral direction 36 that is calculated at step S17 is calculated such that, when vibrations occur in the two contact structures 27-$i$ and 27-($i$+1) as described above, the position is equivalent to the center position between the contact structures 27-$i$ and 27-($i$+1). The detection area is calculated such that the width of the detection area in the lateral direction 36 is equal to the width of the two contact structures 27-$i$ and 27-($i$+1) in the lateral direction 36.

Figure 23:
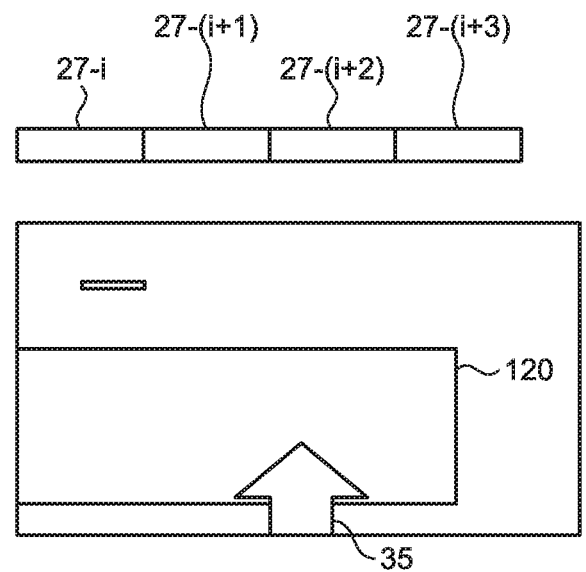
FIG. 23 is a plane view of a sticky note that bumps against a plurality of contact structures.

FIG. 23 is a plane view of a sticky note that bumps against a plurality of contact structures. As illustrated in FIG. 23, a sticky note 120 is arranged such that, when a medium is conveyed in the paper conveyance direction 35, the sticky note 120 bumps against the contact structures 27-$i$ to 27-($i$+3).

Figure 24:
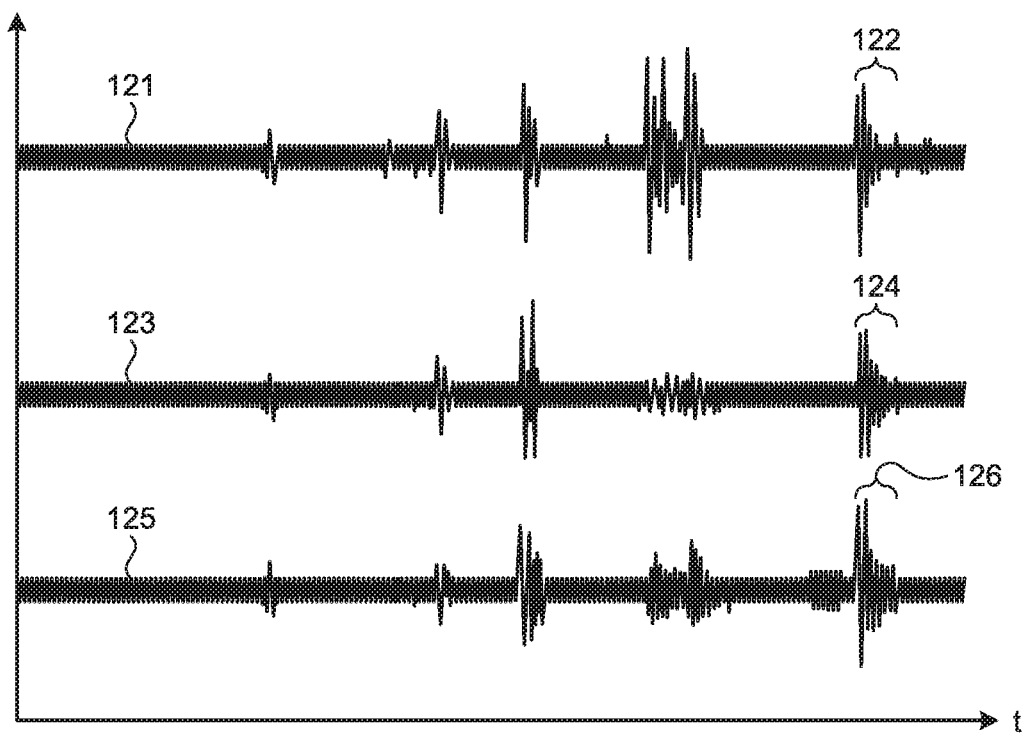
FIG. 24 is a graph of a plurality of vibrations that occur respectively in a plurality of contact structures when a sticky note bumps against a contact structures.

FIG. 24 is a graph of a plurality of vibrations that occur respectively in a plurality of contact structures when the sticky note bumps against the contact structures. A waveform 121 represents vibrations that occur in the contact structure 27-$i$ that bumps against the sticky note 120. The waveform 121 represents that the vibrations that occur in the contact structure 27-$i$ contains vibration 122 that occurs because the sticky note 120 bumps against the contact structure 27-$i$. A waveform 123 represents vibration that occurs in the contact structure 27-($i$+1) that bumps against the sticky note 120. The waveform 123 represents that the vibrations that occur in the contact structure 27-($i$+1) contain vibration 124 that occurs because the sticky note 120 bumps against the contact structure 27-($i$+1). A waveform 125 represents vibrations that occur in the contact structure 27-($i$+2) that bumps against the sticky note 120. The waveform 125 represents that the vibrations that occur in the contact structure 27-($i$+2) contain vibration 126 that occurs because the sticky note 120 bumps against the contact structure 27-($i$+2).

When a staple is longer than the width of two contact structures in the lateral direction 36, the staple may bump against at least three of the contact structures 27-1 to 27-N. For example, a natural number n obtained by rounding the value represented using a staple width x and a pitch s by the expression $$x \div s$$

represents a value obtained by subtracting 1 from the maximum number of contact structures against which one staple bumps among the contact structures 27-1 to 27-N. The staple width x represents a length of that one staple and represents the maximum value of the diameter of that one staple. The pitch s represents a pitch between positions in which the contact structures 27-1 to 27-N are arranged, respectively.

The natural number n is used for the determination at step S13. In other words, as for m that is the number of contact structures in which the given vibrations occur and that are connected in the lateral direction 36 among the contact structures 27-1 to 27-N, when the following inequality $$m \leq n+1$$

is true, the controller 52 determines that the vibrations are caused by a staple. When the controller 52 determines that the vibrations are caused by a staple and the number m is 3 or larger, a detection area is calculated at step S17 such that the detection area is in a position equivalent to the center position of the m contact structures of the contact structures 27-1 to 27-N.

As for the number m, when the following inequality $$M \geq n+2$$

is true, the controller 52 determines that the vibrations are caused by a cause other than a staple. The sticky note 120 is generally longer than a staple and the determination at step S13 in FIG. 8 prevents the controller 52 from falsely detecting the sticky note 120 as a staple and thus enables proper detection on whether there is a staple.

Figure 25:
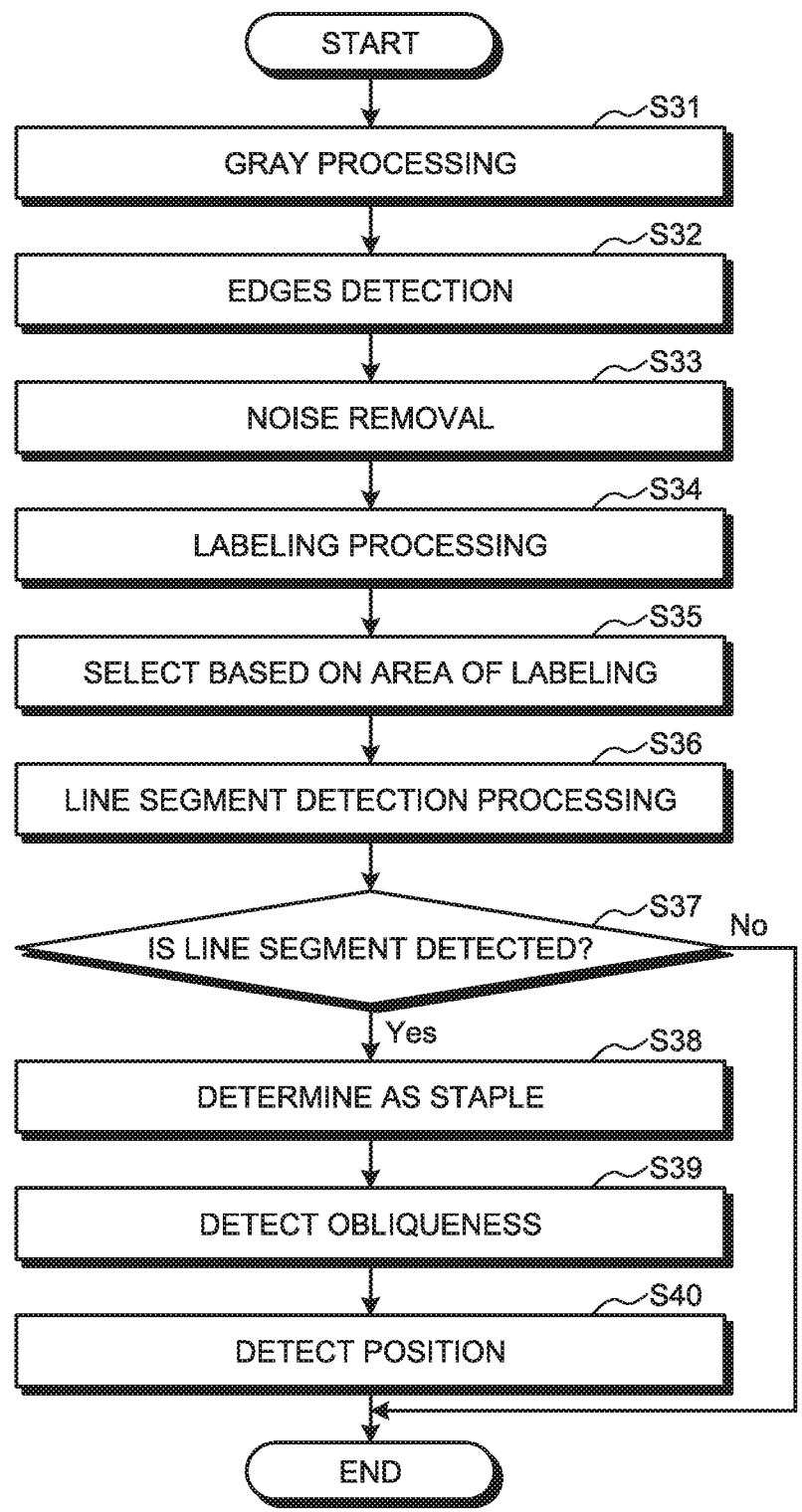
FIG. 25 is a flowchart of operations to calculate a position in which a staple is arranged and an obliqueness of the staple.

FIG. 25 is a flowchart of operations to calculate a position in which a staple is arranged and an obliqueness of the staple. FIG. 25 illustrates the process at step S9 in the flowchart of FIG. 7. As illustrated in FIG. 25, first of all, the controller 52 generates a grayscale image obtained by converting an image that is captured by the image capturing unit 7 by performing gray processing (step S31). The controller 52 detects edges of the grayscale image that is generated at step S31 to generate an image in which parts discontinuous changes in the grayscale image are specified (step S32). The controller 52 removes noises from the image that is generated at step S32 to generate an image from which the parts unnecessary to detect a potion and obliqueness of the staple are removed (step S33).

The controller 52 specifies a plurality of figures represented in the image by performing labeling processing on the image that is generated at step S33 (step S34). The controller 52 selects a diagram whose area is equal to or larger than a given value from the diagrams that are specified at step S34 (step S35). The controller 52 extracts a diagram containing a line segment whose length is equal to or larger than a given length by performing line segment detection processing on the diagram that is selected at step S35 (step S36).

When the diagram containing the line segment whose length is equal to or larger than the given length is extracted (YES at step S37), the controller 52 determines that the diagram represents a staple and determines that the medium has a staple (step S38). When a diagram containing a line segment whose length is equal to or larger than the given length is not extracted (NO at step S37), the controller 52 determines that the diagram does not represent any staple and determines that the medium has no staple. When it is determined that the medium has a staple, the controller 52 detects obliqueness at which the staple is arranged based on the diagram (step S39) and detects a position in which the staple is arranged based on the diagram (step S40). Such image processing enables the controller 52 to properly detect whether there is a staple and to, even when a punched hole is detected falsely as a staple by the operations in FIG. 9, determine that the punched hole is not a staple. Such image processing further enables the controller 52 to properly detect a position and obliqueness of the staple and thus the fastening member removal device 3 is able to properly remove the staple from the medium based on the detected position and obliqueness of the staple.

Effect of Fastening Member Detection Device

The fastening member detection device 1 of the embodiment includes the contact structure 27-*i* that moves with respect to the medium while contacting the medium, the vibration sensor 41-*i* the detects vibrations that occur in the contact structure 27-*i*, and the controller 52 that determines whether there is a staple that fastens the medium based on the vibrations. With a technology to detect a staple by using a magnetic metal detection technology, when a staple is formed of a non-magnetic material, it may be falsely detected that there is no staple. With a method of detecting staple by conduction through conductive rubber rollers between which a medium is interposed, when anticorrosive treatment has been applied to the surface of a staple, no conduction may occur and thus no staple may be detected. With a technology to detect a staple by performing image processing on an image of a medium, when an image of a staple is illustrated on a medium, the image may be detected falsely as a staple. The fastening member detection device 1 determines whether there is a staple based on vibrations that occur in a contact structure 27-*i* because the contact structure 27-*i* bumps against a staple, thereby preventing false detection and enabling proper detection on whether there is a staple that fastens a medium.

The controller 52 determines that there is a staple when the amplitudes of vibrations are at or above the threshold. The fastening member detection device 1 is able to prevent false detection of vibrations caused in the contact structure 27-*i* by a cause other than a staple as vibrations caused by a staple and is able to properly determine that there is a staple.

In the contact structure 27-*i*, the fastening member taper surface 38 on which a staple slides is formed in a part that bumps against a staple. In the fastening member detection device 1, after the contact structure 27-*i* bumps against a staple, the staple slides on the fastening member taper surface 38 and thus the contact structure 27-*i* is prevented from being damaged by the staple. Preventing the contact structure 27-*i* from being damaged enables the fastening member detection device 1 to properly detect vibrations in the contact structure 27-*i*.

The fastening member detection device 1 of the embodiment further includes the spring 28-*i* that pushes the contact structure 27-*i* against the medium. The spring 28-*i* of the fastening member detection device 1 causes the contact structure 27-*i* to properly contact the medium and causes the contact structure 27-*i* to bump against the staple properly, thereby enabling proper detection on whether there is a staple.

The spring 28-*i* pushes the contact structure 27-*i* against the medium by elastic force. The spring 28-*i* may be replaced with a pushing member that pushes the contact structure 27-*i* against the medium by a force other than elastic force. A magnet that pushes the contact structure 27-*i* against the medium by magnetic force is exemplified as the pushing member. When given vibrations occur in the contact structure 27-*i* when the contact structure 27-*i* bumps against a staple without being pushed against the medium, the spring 28-*i* may be omitted.

The fastening member detection device 1 includes the contact structures 27-1 to 27-N that are arranged respectively in positions different from one another and the vibration sensors 41-1 to 41-N that respectively detect the vibrations that occur in the respective contact structures 27-1 to 27-N. The controller 52 determines whether there is a staple based on the detected vibrations. The fastening member detection device 1 determines whether there is a staple based on the number of contact structures 27-*i* in which vibrations occur, thereby preventing false detection of a sticky note attached onto a medium as a staple and enabling proper detection on whether there is a staple.

The controller 52 calculates an area in which a staple is arranged based on the vibrations. Based on timing at which vibrations occur in the contact structure 27-*i*, the fastening member detection device 1 is able to detect a position in the paper conveyance direction 35 in which a staple is arranged. Based on the position of the contact structure 27-*i* in which vibrations occur in the lateral direction 36, the fastening member detection device 1 is able to detect a position in the lateral direction 36 in which a staple is arranged.

The fastening member detection device 1 further includes the conveyance unit 8 the conveys the medium and the roller 26 that contacts the medium. The contact structure 27-*i* is supported such that the contact structure 27-*i* is pivotable on the rotation axis 32. The roller 26 moves the contact structure 27-*i* such that the distance between the medium and the rotation axis 32 is kept constant. In the fastening member detection device 1, the rotation axis 32 moves according to the thickness of the medium and this causes the contact surface 37 of the contact structure 27-*i* to adhere to the surface of the medium with any thickness. In the fastening member detection device 1, the contact surface 37 adheres to the surface of the medium and this enables the contact structure 27-*i* to vibrate properly when the contact structure 27-*i* bumps against a staple and enables proper detection on whether there is a staple.

The fastening member detection device 1 further includes the paper sensor that detects a first time at which an end of the medium passes through a given position. The controller 52 determines whether there is a staple based on the first time and a second time at which vibrations occur in the contact stricture 27-*i*. In other words, the fastening member detection device 1 is able to calculate a period during which the contact structure 27-*i* contacts the medium based on the time at which the end of the medium passes through the given position. The fastening member detection device 1 is able to detect the position of the staple properly without detecting vibrations occurring in the contact structure 27-*i* in a period other than the calculated period falsely as vibrations caused by a staple.

The fastening member detection device 1 further includes the image capturing unit 7 that captures an image of the calculated area. The controller 52 calculates a position in which a staple is arranged in the area based on the image. When whether there is a staple is determined based on the image of the medium, a diagram illustrated on the medium may be detected falsely as a staple and thus a position of the staple may be calculated improperly. The fastening member detection device 1 is able to calculate the position of the staple properly by calculating the position of the staple based on the image of the area that is detected based on vibrations. The fastening member detection device 1 further captures an image of the area that is detected based on the vibrations and thus is able to cause the image capturing unit 7 to get closer to the medium than other image capturing units that capture images of the whole medium are. In the fastening member detection device 1, the image capturing unit 7 is caused to get close to the medium and this enables scale reduction of the device.

The controller 52 further calculates orientation of the arranged staple based on the captured image. By calculating the obliqueness at which the staple is arranged, the fastening member detection device 1 is able to provide the calculated obliqueness of the staple to the fastening member removal device 3. The fastening member removal device 3 is able to properly remove the staple from the medium based on the calculated obliqueness of the staple.

First Modification of Contact Structure Unit

Figure 26:
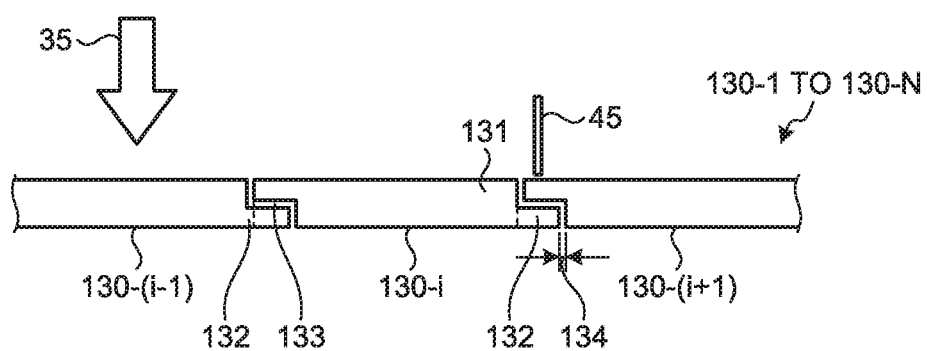
FIG. 26 is a plane view of a first modification of the contact structures.

Each of the contact structures 27-1 to 27-N has the contact surface 37 that is formed in an oblong. The contact structures 27-1 to 27-N may be replaced with a plurality of other contact structures each having a contact surface that is formed in a shape different from an oblong shape. FIG. 26 is a plane view of a first modification of the contact structures. As illustrated in FIG. 26, each contact stricture 130-$i$ of a plurality of contact structures 130-1 to 130-N of the first modification has a contact surface 131 with which the above-described contact surface 37 of the contact structure 27-$i$ is replaced. The contact stricture 130-$i$ is formed approximately similarly to the above-described contact structure 27-$i$ except that the contact surface 37 of the contact structure 27-$i$ is replaced with the contact surface 131. The contact surface 131 is formed in an approximately oblong shape and a convex 132 and a concave 133 are formed in the contact surface 131. The convex 132 is formed such that the convex 132 protrudes from a side of the oblong opposed to the contact structure 130-($i$+1) toward the contact structure 130-($i$+1). The concave 133 is formed such that the concave 133 is concave inwardly from a side of the oblong opposed to the contact structure 130-($i$–1). The size of the concave 133 is larger than that of the convex 132. The contact structures 130-1 to 130-N are arranged such that the convex 132 in the contact surface 131 of the contact structure 130-($i$–1) gets into the concave 133 of the contact surface 131 of the contact structure 130-$i$.

The contact structures 130-1 to 130-N are arranged as described above and thus a diagram obtained by orthogonally projecting the contact surface 131 of the contact structure 130-$i$ to a plane surface orthogonal to the paper conveyance direction 35 overlaps a diagram obtained by orthogonally projecting the contact surface 131 of the contact structure 130-($i$–1) to the plane surface. The diagram obtained by orthogonally projecting the contact surface 131 of the contact structure 130-$i$ to the plane surface further overlaps a diagram obtained by orthogonally projecting the contact surface 131 of the contact structure 130-($i$+1) to the plane surface. Accordingly, even when the width of a clearance 134 is formed larger than the thickness of the staple 45, the contact structures 130-1 to 130-N prevents the staple 45 from going through the clearance 134 without bumping against any contact structure. As a result, a fastening member detection device that includes the contact structures 130-1 to 130-N is able to properly detect whether there is a staple as the above-described fastening member detection device 1 does.

Second Modification of Contact Structure

Figure 27:
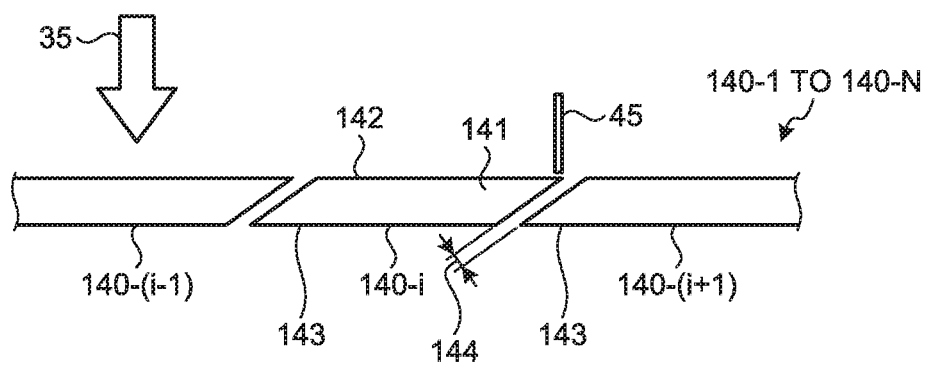
FIG. 27 is a plane view of a second modification of the contact structures.

FIG. 27 is a plane view of a second modification of the contact structures. As illustrated in FIG. 27, each contact stricture 140-$i$ of a plurality of contact structures 140-1 to 140-N of the second modification has a contact surface 141 with which the contact surface 37 of the above-described contact structure 27-$i$ is replaced. The contact stricture 140-$i$ is formed approximately similarly to the above-described contact structure 27-$i$ except that the contact surface 37 of the contact structure 27-$i$ is replaced with the contact surface 141. The contact surface 141 is formed in a parallelogram shape and has an upstream side 142 and a downstream side 143 that are perpendicular to the paper conveyance direction 35. A right end of the upstream side 142 is arranged on the right of the right end of the downstream side 143. The contact structures 140-1 to 140-N are arranged such that the right end of the upstream side 142 of the contact structure 140-$i$ is arranged on the right of the left end of the downstream side 143 of the contact structure 140-($i$+1).

The contact structures 140-1 to 140-N are arranged as described above and thus a diagram obtained by orthogonally projecting the contact surface 141 of the contact structure 140-$i$ to a plane surface orthogonal to the paper conveyance direction 35 overlaps a diagram obtained by orthogonally projecting the contact surface 141 of the contact structure 140-($i$–1) to the plane surface. The diagram obtained by orthogonally projecting the contact surface 141 of the contact structure 140-$i$ to the plane surface further overlaps a diagram obtained by orthogonally projecting the contact surface 141 of the contact structure 140-($i$+1) to the plane surface. Accordingly, even when the width of a clearance 144 is formed larger than the thickness of the staple 45, the contact structures 140-1 to 140-N prevents the staple 45 from going through the clearance 144 without bumping against any contact structure. As a result, a fastening member detection device that includes the contact structures 140-1 to 140-N is able to properly detect whether there is a staple as the above-described fastening member detection device 1 does.

Figure 28:
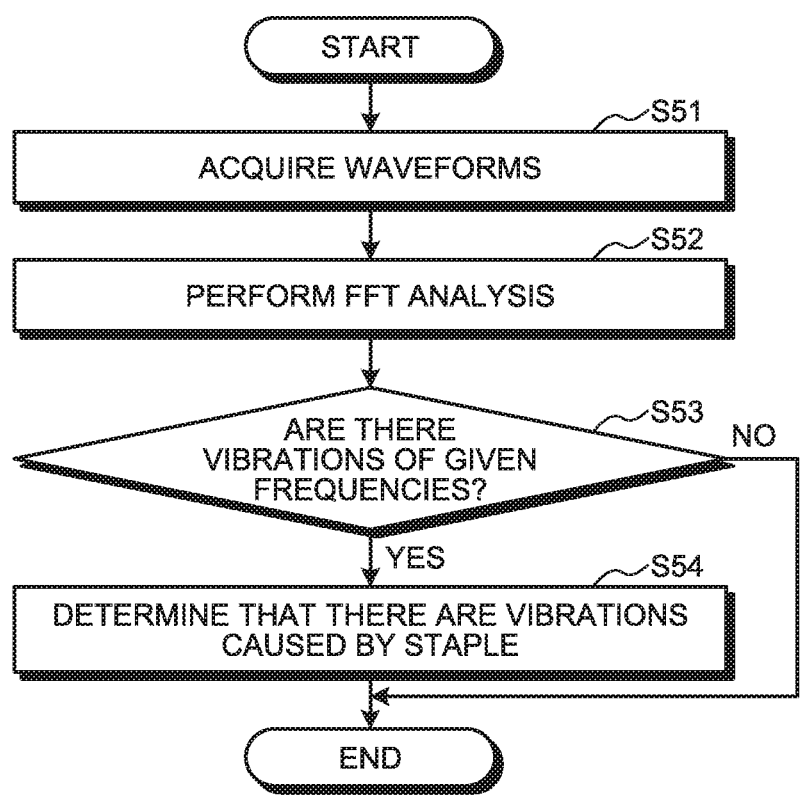
FIG. 28 is a flowchart illustrating other operations of detecting whether there is a fastening member.

According to the operations in FIG. 9, whether there is a staple is determined based on the amplitudes of vibrations that occur in the contact structure 27-$i$. The operations may be replaced with operations to make determination based on properties other than amplitudes of vibrations. FIG. 28 is a flowchart of other operations to detect whether there is a fastening member. When a plurality of vibrations are detected by the vibration sensors 41-1 to 41-N, respectively, the controller 52 acquires waveforms of the respective vibrations as illustrated in FIG. 28 (step S51). The controller 52 analyzes the waveforms of the vibrations by fast Fourier transform (FFT) (step S52). When the vibrations do not contain vibrations in a given frequency band (NO at step S53), the controller 52 determines that there is no staple fastening the medium. When the acquired vibrations contain vibrations in the given frequency band (YES at step S53), the controller 52 determines that there is a staple fastening the medium (step S54).

A lot of vibrations contained in the given frequency band appear in vibrations that occur in the contact structure 27-$i$ because a staple bumps against the fastening member taper surface 38 of the contact structure 27-$i$. Thus, by performing FFT analysis on the vibrations that occur in the contact structure 27-$i$, the fastening member detection device 1 is able to detect properly whether there is a staple.

The staple may be replaced with another fastening member that fastens a plurality of sheets of paper together. The fastening member protrudes from the surface of the sheets of paper and a clip, a fastening rope, and a part of the sheets of paper that is cut out of the sheets of paper and is flipped up are exemplified as the fastening member. When conveyed on the conveyance path 18, the fastening member bumps against the contact structure 27-$i$ as a staple does and thus vibrates the contact structure 27-$i$. For this reason, by determining whether there is the fastening member based on vibrations that occur in the contact structure 27-$i$, the fastening member detection device 1 is able to properly detect whether there is the fastening member.

The fastening member detection device disclosed herein enables proper detection on whether there is a fastening member.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:

1. A fastening member detection device comprising:
   a contact structure that moves with respect to a medium while contacting the medium and has a taper on which a fastening member that fastens the medium slides and that is formed in a part that bumps against the fastening member;
   a pushing member that pushes the contact structure against the medium;
   a vibration detector that detects vibration that occurs in the contact structure; and
   a controller that determines that there is the fastening member when amplitude of the vibration is at or above a threshold,
   wherein
   the contact structure includes a plurality of contact structures that are arranged respectively in a plurality of positions that are different from one another,
   the vibration detector includes a plurality of sensors that respectively detect a plurality of vibrations that occur in the contact structures, and
   the controller determines whether there is the fastening member based on the vibrations and calculates an area in which the fastening member is arranged based on the vibrations.

2. The fastening member detection device according to claim 1, further comprising:
   a conveyance unit that conveys the medium; and
   a roller that contacts the medium,
   wherein
   the contact structure is supported such that the contact structure is pivotable on a rotation axis,
   the roller moves the contact structure such that a distance between the medium and the rotation axis is kept constant.

3. The fastening member detection device according to claim 2, further comprising a paper sensor that detects a first time at which an end of the medium passes through a given position,
   wherein the controller determines whether there is the fastening member based on the first time and a second time at which the vibrations occur.

4. The fastening member detection device according to claim 3, further comprising an image capturing unit that captures an image of the area,
   wherein the controller calculates a position in which the fastening member is arranged in the area, based on the image.

5. The fastening member detection device according to claim 4, wherein the controller calculates orientation of the arranged fastening member, based on the image.

6. A fastening member detection device comprising:
   a contact structure that moves with respect to a medium while contacting the medium;
   a vibration detector that detects vibration that occurs in the contact structure;
   a controller that determines whether there is a fastening member that fastens the medium, based on the vibration;
   a conveyance unit that conveys the medium; and
   a roller that contacts the medium,
   wherein
   the contact structure is supported such that the contact structure is pivotable on a rotation axis,
   the roller moves the contact structure such that a distance between the medium and the rotation axis is kept constant.

* * * * *